United States Patent
Ishii

(10) Patent No.: US 9,531,566 B2
(45) Date of Patent: Dec. 27, 2016

(54) CONTROL APPARATUS, A COMMUNICATION SYSTEM, A COMMUNICATION METHOD AND A RECORDING MEDIUM HAVING RECORDED THEREON A COMMUNICATION PROGRAM INCLUDING A CONTROL UNIT, A NETWORK CONFIGURATION INFORMATION MANAGEMENT UNIT, AND A PATH CONTROL UNIT

(75) Inventor: Shuji Ishii, Tokyo (JP)

(73) Assignee: NEC Corporation, Tokyo (JP)

( * ) Notice: Subject to any disclaimer, the term of this patent is extended or adjusted under 35 U.S.C. 154(b) by 177 days.

(21) Appl. No.: 13/818,085

(22) PCT Filed: Jul. 1, 2011

(86) PCT No.: PCT/JP2011/065645
§ 371 (c)(1),
(2), (4) Date: Feb. 20, 2013

(87) PCT Pub. No.: WO2012/029409
PCT Pub. Date: Mar. 8, 2012

(65) Prior Publication Data
US 2013/0144995 A1    Jun. 6, 2013

(30) Foreign Application Priority Data

Sep. 3, 2010  (JP) .................................. 2010-197630

(51) Int. Cl.
*H04L 12/46* (2006.01)
*H04L 12/24* (2006.01)

(52) U.S. Cl.
CPC ....... *H04L 12/4645* (2013.01); *H04L 41/0856* (2013.01); *H04L 12/4675* (2013.01)

(58) Field of Classification Search
CPC ............ H04L 12/4645; H04L 12/4675; H04L 41/0856; H04L 12/4641
(Continued)

(56) References Cited

U.S. PATENT DOCUMENTS

| 5,892,912 A | 4/1999 | Suzuki et al. |
| 2004/0103282 A1* | 5/2004 | Meier ................ G06Q 20/3674 713/171 |

(Continued)

FOREIGN PATENT DOCUMENTS

| CN | 1947390 A | 4/2007 |
| CN | 101110749 A | 1/2008 |

(Continued)

OTHER PUBLICATIONS

International Search Report in PCT/JP2011/065645 dated Oct. 18, 2011 (English Translation Thereof).

(Continued)

*Primary Examiner* — Alina N Boutah
(74) *Attorney, Agent, or Firm* — McGinn IP Law Group, PLLC

(57) ABSTRACT

A control apparatus for controlling packet transfer between terminals belonging to a first virtual network identified by a first identifier includes a network configuration information management unit for holding configuration information on a second virtual network identified by a second identifier so that the terminals belong to the second virtual network; and a path control unit for controlling communication between the terminals based on the configuration information on the second virtual network.

46 Claims, 23 Drawing Sheets

(58) Field of Classification Search
USPC .................................... 709/220, 223, 226
See application file for complete search history.

(56) References Cited

U.S. PATENT DOCUMENTS

| | | | |
|---|---|---|---|
| 2004/0107436 A1* | 6/2004 | Ishizaki | H04H 20/06 725/36 |
| 2004/0202171 A1 | 10/2004 | Hama | |
| 2004/0248557 A1* | 12/2004 | Muratsu | H04L 12/4641 455/411 |
| 2005/0053046 A1* | 3/2005 | Wang | H04L 12/4645 370/338 |
| 2005/0111455 A1* | 5/2005 | Nozue | H04L 12/4645 370/392 |
| 2005/0113090 A1* | 5/2005 | Sharony | G01S 5/0252 455/436 |
| 2005/0165953 A1* | 7/2005 | Oba | H04L 12/4633 709/238 |
| 2005/0174943 A1* | 8/2005 | Wang | H04L 12/4645 370/235 |
| 2005/0286537 A1* | 12/2005 | Shimada | H04L 12/4645 370/395.53 |
| 2006/0067335 A1* | 3/2006 | Maya | H04L 12/2602 370/397 |
| 2006/0114839 A1* | 6/2006 | Meier | H04L 41/0843 370/254 |
| 2006/0206933 A1* | 9/2006 | Molen | H04L 63/0428 726/14 |
| 2006/0248227 A1* | 11/2006 | Hato | H04L 12/4633 709/245 |
| 2006/0274771 A1 | 12/2006 | Doi | |
| 2007/0053508 A1* | 3/2007 | Yasumoto | H04L 63/105 380/28 |
| 2007/0076650 A1* | 4/2007 | Manjeshwar | H04W 24/02 370/328 |
| 2007/0171918 A1* | 7/2007 | Ota | H04L 12/2856 370/395.53 |
| 2007/0204158 A1* | 8/2007 | Hatashita | H04L 63/062 713/171 |
| 2007/0230481 A1* | 10/2007 | Ikeda | H04L 12/2856 370/395.53 |
| 2007/0242657 A1* | 10/2007 | Waisman-Diamond | G06Q 20/10 370/352 |
| 2007/0260720 A1* | 11/2007 | Morain | H04L 12/189 709/223 |
| 2007/0263660 A1* | 11/2007 | Mitsumori | H04L 12/42 370/469 |
| 2007/0294760 A1* | 12/2007 | Sood | H04L 63/0272 726/15 |
| 2008/0013481 A1* | 1/2008 | Simons | H04L 63/104 370/328 |
| 2008/0075078 A1* | 3/2008 | Watanabe | H04L 12/185 370/390 |
| 2008/0095368 A1* | 4/2008 | Iida | H04L 63/0272 380/259 |
| 2008/0172742 A1* | 7/2008 | Inoue | H04L 63/145 726/24 |
| 2008/0240122 A1 | 10/2008 | Richardson et al. | |
| 2009/0067436 A1* | 3/2009 | Gast | H04L 12/4679 370/395.53 |
| 2009/0086630 A1* | 4/2009 | Hamada | H04L 63/0272 370/230 |
| 2009/0097485 A1* | 4/2009 | Okada | H04L 12/185 370/390 |
| 2009/0112453 A1* | 4/2009 | Mo | G08G 1/096811 701/119 |
| 2009/0190596 A1* | 7/2009 | Godlewski | H04W 8/087 370/395.31 |
| 2009/0207756 A1* | 8/2009 | Sakai | H04L 41/0873 370/254 |
| 2009/0304008 A1* | 12/2009 | Kono | H04L 12/4641 370/395.53 |
| 2010/0074261 A1* | 3/2010 | Muhamed | H04L 12/4662 370/395.3 |
| 2010/0091681 A1* | 4/2010 | Sonoda | H04L 12/4641 370/252 |
| 2010/0158025 A1* | 6/2010 | Meki | H04L 12/42 370/401 |
| 2010/0158035 A1* | 6/2010 | Kim | H04L 45/12 370/437 |
| 2011/0004913 A1* | 1/2011 | Nagarajan | H04L 63/102 726/1 |
| 2011/0013551 A1* | 1/2011 | Shiroko | H04L 12/185 370/312 |
| 2011/0038254 A1* | 2/2011 | Hashiguchi | H04L 45/1283 370/217 |
| 2011/0093579 A1* | 4/2011 | Koizumi | H04L 41/06 709/223 |
| 2012/0275328 A1* | 11/2012 | Iwata | H04L 12/4633 370/252 |

FOREIGN PATENT DOCUMENTS

| | | |
|---|---|---|
| CN | 101179489 A | 5/2008 |
| JP | 2002-164937 A | 6/2002 |
| JP | 2003-318937 A | 11/2003 |
| JP | 2006-254340 A | 9/2006 |
| JP | 2006-311066 A | 11/2006 |

OTHER PUBLICATIONS

IEEE Standard 802.1Q.-2005 and IEEE Standard for Local and metropolitan area networks—Virtual Bridged Local Area Networks.
OpenFlow Switch Specification Version 1.0.0 (Wire Protocol 0x01), Dec. 31, 2009 <URL:http://www.openflowswitch.org/documents/openflow-spec-v1.0.0.pdf>.
Chinese Office Action dated Dec. 24, 2014 with an English translation thereof.
Extended European Search Report dated Nov. 2, 2016.

* cited by examiner

FIG. 2

| VLAN-ID | MAC ADDRESS | NW-ID | SWITCH LIST |
|---|---|---|---|

NETWORK CONFIGURATION INFORMATION TABLE 101

NETWORK CONFIGURATION INFORMATION ENTRY 101-1
NETWORK CONFIGURATION INFORMATION ENTRY 101-2
NETWORK CONFIGURATION INFORMATION ENTRY 101-N

FIG. 3

| TRANSFER TABLE 112 | | | | | | |
|---|---|---|---|---|---|---|
| VLAN-ID | SRC MAC ADDRESS | DST MAC ADDRESS | CONTENT OF PROCESS | INPUT PORT | OUTPUT PORT | TRANSFER TABLE ENTRY 112-1 |
| VLAN-ID | SRC MAC ADDRESS | DST MAC ADDRESS | CONTENT OF PROCESS | INPUT PORT | OUTPUT PORT | TRANSFER TABLE ENTRY 112-2 |
| ... | ... | ... | ... | ... | ... | |
| VLAN-ID | SRC MAC ADDRESS | DST MAC ADDRESS | CONTENT OF PROCESS | INPUT PORT | OUTPUT PORT | TRANSFER TABLE ENTRY 112-M |

FIG. 7

NETWORK CONFIGURATION INFORMATION TABLE 201

| VLAN-ID | MAC ADDRESS | L3 ADDRESS | NW-ID | SWITCH LIST | |
|---|---|---|---|---|---|
| | | | | | ← NETWORK CONFIGURATION INFORMATION ENTRY 201-1 |
| VLAN-ID | MAC ADDRESS | L3 ADDRESS | NW-ID | SWITCH LIST | ← NETWORK CONFIGURATION INFORMATION ENTRY 201-2 |
| ⋯ | ⋯ | ⋯ | ⋯ | ⋯ | |
| VLAN-ID | MAC ADDRESS | L3 ADDRESS | NW-ID | SWITCH LIST | ← NETWORK CONFIGURATION INFORMATION ENTRY 201-N |

FIG. 9

NETWORK CONFIGURATION INFORMATION TABLE 301

| VLAN-ID | MAC ADDRESS | NW-ID | SWITCH LIST | NETWORK CONFIGURATION INFORMATION ENTRY 301-1 |
| --- | --- | --- | --- | --- |
| VLAN-ID | MAC ADDRESS | NW-ID | SWITCH LIST | NETWORK CONFIGURATION INFORMATION ENTRY 301-2 |
| ... | ... | ... | ... | |
| VLAN-ID | MAC ADDRESS | NW-ID | SWITCH LIST | NETWORK CONFIGURATION INFORMATION ENTRY 301-N |

FIG. 10

FLOW-TABLE 312

| VLAN-ID | SRC MAC ADDRESS | DST MAC ADDRESS | Action | INPUT PORT | OUTPUT PORT | FLOW-TABLE ENTRY 312-1 |
| VLAN-ID | SRC MAC ADDRESS | DST MAC ADDRESS | Action | INPUT PORT | OUTPUT PORT | FLOW-TABLE ENTRY 312-2 |
| ... | ... | ... | ... | ... | ... | |
| VLAN-ID | SRC MAC ADDRESS | DST MAC ADDRESS | Action | INPUT PORT | OUTPUT PORT | FLOW-TABLE ENTRY 312-M |

CONTROL APPARATUS, A COMMUNICATION SYSTEM, A COMMUNICATION METHOD AND A RECORDING MEDIUM HAVING RECORDED THEREON A COMMUNICATION PROGRAM INCLUDING A CONTROL UNIT, A NETWORK CONFIGURATION INFORMATION MANAGEMENT UNIT, AND A PATH CONTROL UNIT

TECHNICAL FIELD

The present invention relates to a control apparatus provided in a network for performing communication, a communication system, a communication method and a recording medium of which a communication program recorded.

BACKGROUND ART

In recent years, with surging traffic in a communication network and growing number of services performed in the network, a lot of technologies for establishing a virtual network additionally in the communication network have been developed. There is a VLAN (Virtual Local Area Network) disclosed in the non patent literature 1 as one of typical methods for establishing such a virtual network.

In a network in which a plurality of servers are connected like a large-scale data center, virtualization is generally realized using a VLAN-ID which is an identifier of each VLAN in addition to an IP (Internet Protocol) address for each usage of the server. By this virtualization, a network is designed so as not to be influenced in communication even if an identical IP address is used among a plurality of servers.

However, there is a limitation in the number of VLAN-ID to be allocated, and its number is at most 4,096. When a VLAN is used in a large-scale network, if the VLAN-ID is assigned for each IP address of a server by a method as mentioned above, the number of VLAN-ID becomes insufficient. As a result, there is a problem that sufficient number of the virtual networks cannot be provided.

Technology for solving such problem is disclosed in the patent literature 1. In the patent literature 1, a VLAN domain ID which is another identifier different from the VLAN-ID described in the non patent literature 1 is newly proposed. In the patent literature 1, it describes a technology that a switching hub identifies a VLAN to which a received frame belongs, by combining the VLAN domain ID and the VLAN-ID.

In the patent literature 2, it describes a technology that a source MAC (Media Access Control) address is stored in a MAC address learning table associated with VLAN tag information when a packet has been received.

CITATION LIST

Patent Literature

[Patent Literature 1] Japanese Patent Application Laid-Open No. 2003-318937
[Patent Literature 2] Japanese Patent Application Laid-Open No. 2006-311066

Non Patent Literature

[Non Patent Literature 1] IEEE Standard 802.1 Q.-2005 and IEEE Standard for Local and metropolitan area networks-Virtual Bridged Local Area Networks

[Non Patent Literature 2] OpenFlow Switch Specification Version 1.0.0
(Wire Protocol 0x01), Dec. 31, 2009, [searched on Jul. 20, 2010], the internet.

SUMMARY OF INVENTION

Technical Problem

As mentioned above, the technology described in the patent literature 1 has tried to avoid a limitation in the number of VLAN-ID by combining the existing VLAN-ID and newly provided VLAN domain ID.

However, as the technology described in the patent literature 1 provides a field for the VLAN domain ID in a frame, it also has a limitation in the number of VLAN domain ID, and it still unchanged that there exist a limitation in the number of the virtual network to be provided when a large-scale network is established.

The object of the present invention is to provide a control apparatus, a communication system, a communication method and a recording medium having recorded thereon a communication program which are capable of solving the problem mentioned above.

Solution to Problem

A control apparatus for controlling packet transfer between terminals belonging to a first virtual network identified by a first identifier comprising: a network configuration information management means for holding configuration information on a second virtual network identified by a second identifier so that the terminals belong to the second virtual network; and a path control means for controlling communication between the terminals based on the configuration information on the second virtual network.

A communication system comprising: a terminal which belongs to a first virtual network identified by a first identifier; and a control apparatus for controlling packet transfer between the terminals; wherein the control apparatus including: a network configuration information management means for holding configuration information on a second virtual network identified by a second identifier so that the terminals belong to the second virtual network; and a path control means for controlling communication between the terminals based on the configuration information on the second virtual network.

A communication method for controlling packet transfer between terminals belonging to a first virtual network identified by a first identifier, comprising: controlling communication between the terminals so that the terminals belong to a second virtual network identified by a second identifier based on configuration information on the second virtual network which is held in a network configuration information management means.

A recording medium having recorded thereon a communication program for causing a computer to execute a process of controlling packet transfer between terminals belonging to a first virtual network identified by a first identifier, comprising: a path control process for controlling communication between the terminals so that the terminals belong to a second virtual network identified by a second identifier based on configuration information on the second virtual network which is held in a network configuration information management means.

Advantageous Effects of Invention

According to the present invention, it is possible to establish a large scale network using a second virtual network in spite of the limitation in the number of identifier of the virtual network.

BRIEF DESCRIPTION OF DRAWINGS

FIG. 2 is a figure showing the composition of the network configuration information table 101.

FIG. 3 is a figure showing the composition of the forwarding table 112.

FIG. 7 is a figure showing the composition of the network configuration information table 201.

FIG. 9 is a figure showing the composition of the network configuration information table 301.

FIG. 10 is a figure showing the composition of the flow table 312.

DESCRIPTION OF EMBODIMENTS

Hereinafter, the exemplary embodiments of the present invention will be described in detail with reference to the drawings.

<First Exemplary Embodiment>
(Outline)

Figure 23:
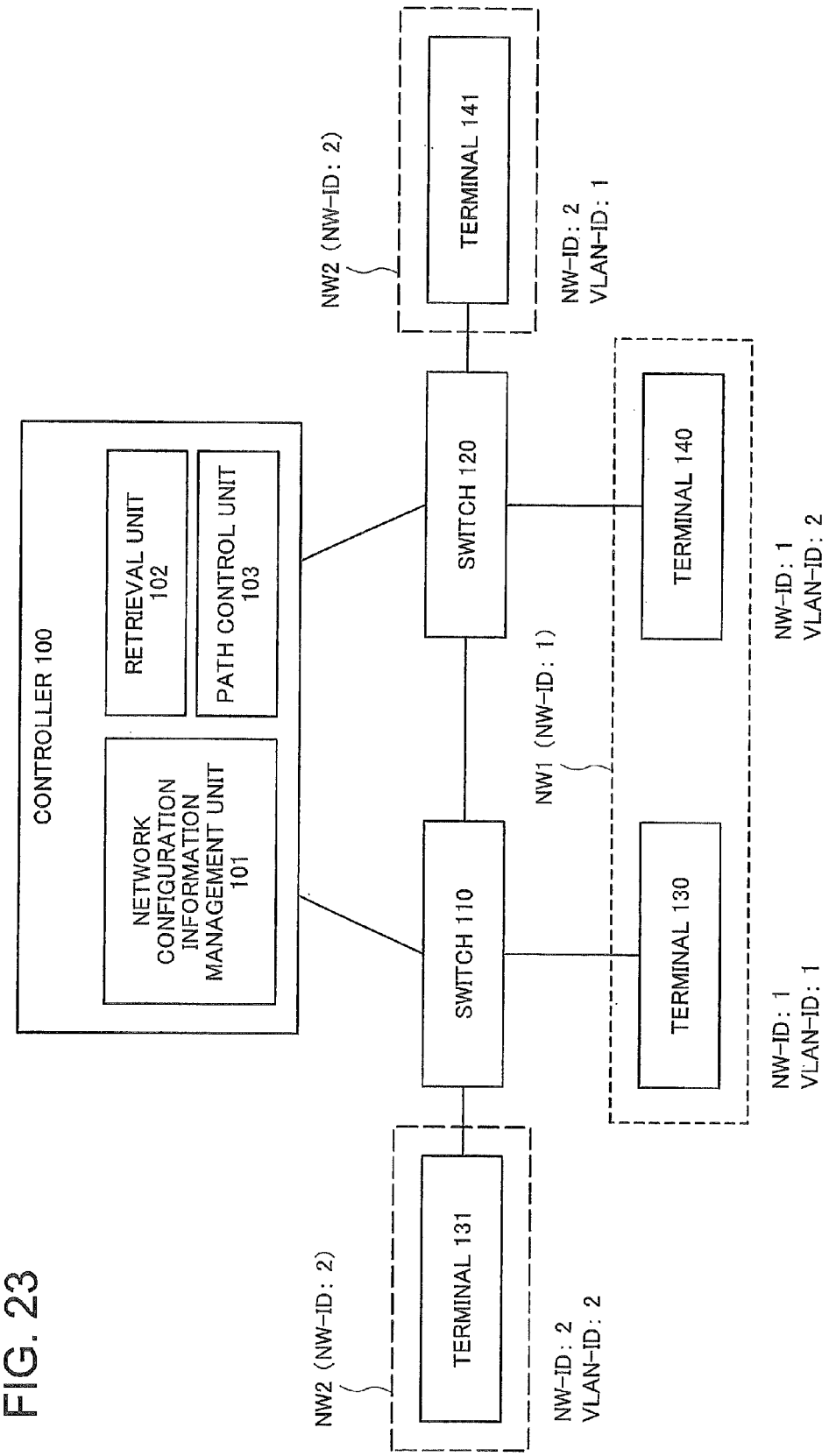
FIG. 23 is a block diagram showing the outline of the first exemplary embodiment.

First, the outline of the first exemplary embodiment will be described below with reference to FIG. 23. FIG. 23 is a block diagram showing an exemplary system configuration according to the first exemplary embodiment. The system of FIG. 23 includes a controller 100, a switch 110, a switch 120, a terminal 130, a terminal 131, a terminal 140 and a terminal 141. The terminal 130 and the terminal 140 belong to a virtual network (NW) 1. The terminal 131 and the terminal 141 belong to NW2. Hereinafter, the virtual network NW is called as "NW".

The controller 100 manages communication performed in the system. The controller 100 includes a network configuration information management unit 101, a search unit 102 and a path control unit 103. Details about the configuration and operation of each unit will be described later.

The switch 110 and the switch 120 send packets communicated between each terminal according to a set processing rule. The terminal 130 and the terminal 131 are connected to the switch 110, and the terminal 140 and the terminal 141 are connected to the switch 120 respectively, and each terminal communicates among them.

According to the first exemplary embodiment, the controller 100, which controls communication between terminals belonging to a VLAN, holds configuration information on a NW in the network configuration information management unit 101 so that each terminal may belong to a virtual network NW which is a different network from the VLAN. Also, the controller 100 controls communication between terminals based on the configuration information on a NW.

NW1 and NW2 are different virtual networks from above-mentioned VLAN. Establishment of a virtual network, having been realized by a VLAN, is now realized by this NW and a virtual network NW-ID which is an identifier of the NW.

Each terminal belongs to a NW and a VLAN and has both identifiers (IDs). As the terminal 130 belongs to the NW1 and the VLAN1, the NW-ID is 1 and the VLAN-ID is 1. Similarly, the terminal 131 belongs to the NW2 and the VLAN2, the terminal 141 belongs to the NW1 and the VLAN2 and the terminal 142 belongs to the NW2 and the VLAN1 respectively. The NW1 is indicated by a dotted line and the NW2 is indicated by a broken line respectively in FIG. 23.

Although a VLAN-ID is assigned to each terminal, it is not used for establishing a virtual network, but it is used as an identifier for identifying each terminal. More specifically, in a network configuration information table 101 shown in FIG. 2, each terminal is identified by combination of an identifier of a terminal, as represented by a MAC address, and a VLAN-ID.

Accordingly, because of the identical NW-IDs, it is possible to communicate between the terminal 130 and the terminal 140 having different VLAN-ID each other. Setting of this communication is performed by the controller 100 which holds the configuration information on a NW.

Hereinafter, the first exemplary embodiment will be described in detail with reference to FIGS. 1 to 5.

(Configuration)

Figure 1:
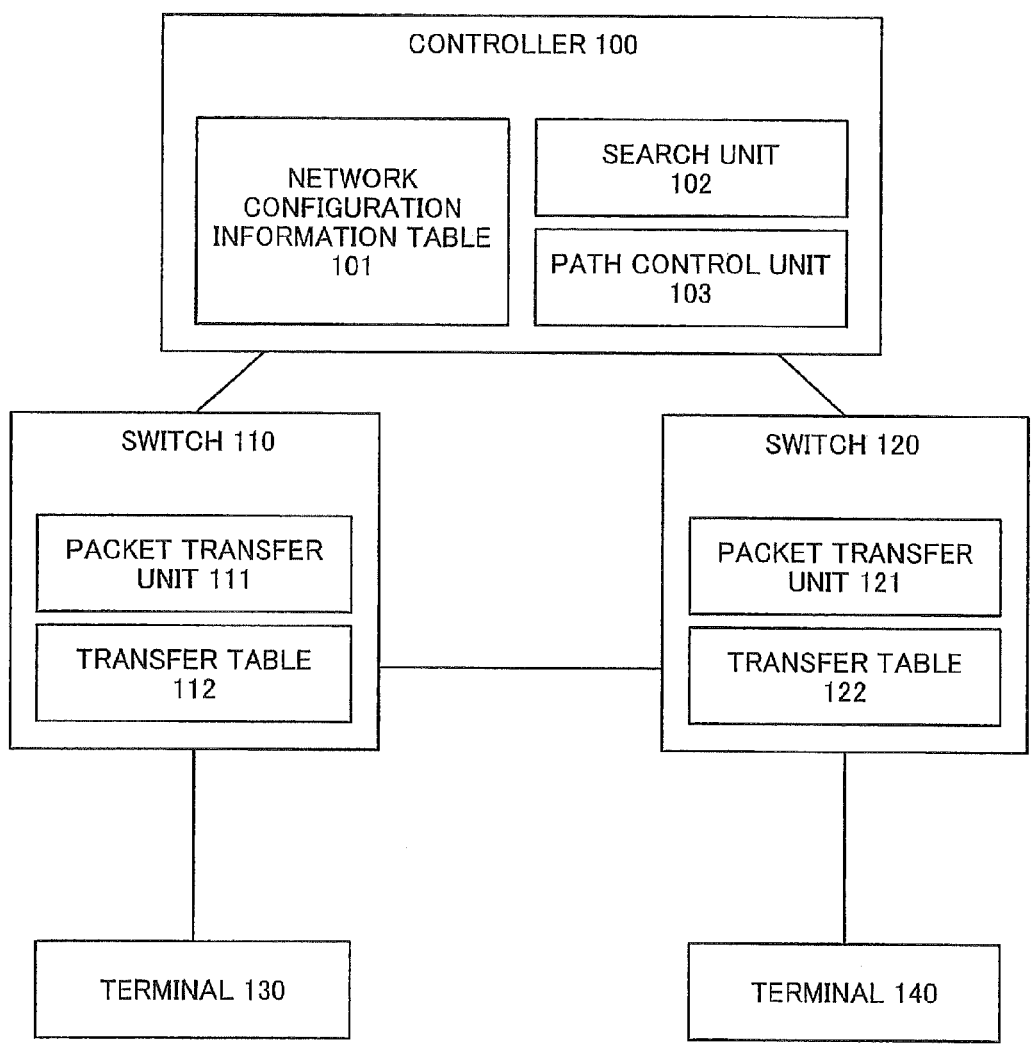
FIG. 1 is a block diagram showing the configuration of the first exemplary embodiment.

The configuration of the first exemplary embodiment will be described with reference to FIG. 1. FIG. 1 is a block diagram showing the system configuration according to the first exemplary embodiment.

According to FIG. 1, the system of the first exemplary embodiment includes a controller 100, a switch 110, a switch 120, a terminal 130 and a terminal 140.

Further, although a case of four terminals has been exemplified in the above-mentioned outline description (FIG. 23) of the first exemplary embodiment, hereinafter, for the sake of simplicity, a case of two terminals as a number of terminals will be described.

The controller 100 includes a network configuration information table 101, a search unit 102 and a path control unit 103. The controller 100 is an apparatus which manages the switch 110, the switch 120, the terminal 130 and the terminal 140.

The network configuration information table 101 is a table which holds information on terminals (the terminal 130 and the terminal 140) in the network which is under the control of the controller 100. Detailed description will be made later in FIG. 2.

Based on information on a packet (hereinafter, "a received packet") which each switch has received, the search unit 102 searches for a VLAN-ID to which a destination terminal of the received packet belongs from the network configuration information table 101.

The path control unit 103 takes out a list of switches which belong to the same network as a source terminal or a destination terminal of the received packet from the network configuration information table 101. Next, a processing rule (an entry) is set to the switch taken out so that communication between the source terminal and the destination terminal of the received packet may become possible.

The switch 110 includes a packet transfer unit 111 and a forwarding table 112. Similarly, the switch 120 includes a packet transfer unit 121 and a forwarding table 122.

The packet transfer unit 111 searches for the received packet whether there is a processing rule corresponding to the received packet in the forwarding table 112. When there is a corresponding processing rule, a processing is performed with reference to a content of processing indicated in the processing rule. For example of the content of processing, there is a processing such as sending the packet to the switch 120 via a specific port (not shown in the figure), discarding the packet, rewriting a header of the packet or broadcasting the packets. When a processing rule corresponding to the received packet is not indicated in the forwarding table 112, the packet transfer unit 111 inquires the controller 100 how the processing is to be performed.

The forwarding table 112 stores information, which correlates the contents of information (a header) on the received packet of the switch 110 to a content of processing according to the header of the received packet, in one entry as a processing rule. As mentioned above, the packet transfer unit 111 performs a processing according to this processing rule for the received packet. Detailed description will be made later in FIG. 3.

Further, because the packet transfer unit 121 and the forwarding table 122 of the switch 120 are similar to the packet transfer unit 111 and the forwarding table 112 of the switch 110, the description for them will be omitted. Although the number of switches shown in FIG. 1 is two, it is not limited to this and it operates similarly even in a case of equal to or more than three.

The terminal 130 performs packet communication with the terminal 140. Similarly, the terminal 140 performs packet communication with the terminal 130. Henceforth, although it will be described as the packet communication is to be performed in a direction from the terminal 130 to the terminal 140, it is not limited to this and it operates even in a case of an opposite direction.

FIG. 2 is a figure showing details of the network configuration information table 101. The network configuration information table 101 includes network configuration information entries 101-1 and 101-2 or the like. Each of the network configuration information entries holds information on a terminal in the network which the controller 100 manages. Accordingly, the network configuration information table 101 holds as many network configuration information entries as the number of terminals, N.

A network configuration information entry includes a VLAN-ID, a MAC address, a NW-ID which is an identifier for identifying a NW and a switch list. Hereinafter, the network configuration information entry 101-1 will be described as an example. The network configuration information entry 101-1 corresponds to the terminal 130 in FIG. 1. An identifier of the VLAN to which the terminal 130 belongs is stored in the "VLAN-ID". A MAC address which is a specific identifier of the terminal 130 is stored in the "MAC address". Further, according to the first exemplary embodiment, although a MAC address is used as a specific identifier of a terminal, it is not limited to this. For example, an IP address can be used.

An identifier of the NW to which the terminal 130 belongs is stored in the "NW-ID". Further, as the NW-ID, for example, a network address which is expressed by using a front half part of an IP address assigned to each terminal or an SSID (Service Set Identifier) or the like which is an identifier of a wireless LAN (Local Area Network) is mentioned. As far as it is different from an ID of the VLAN which is a virtual network, it is not limited to these and new identifiers can be set and used.

Finally, a list of the switches belonging to the NW to which the terminal 130 belongs is stored in the "switch list". In the example of FIG. 2, the switch 110 and the switch 120 are stored. This switch list is generated from information on each switch (a VLAN-ID, a MAC address and a NW-ID) that the controller 100 has collected. As other composition of the switch list, for example, a list of switches that exist on a calculated route obtained by calculating a transfer route of the received packet can be stored.

The switch list is not indispensable to the network configuration information table 101. It is also possible that information on the switches controlled by the controller 100 is collected whenever the network configuration information table 101 is searched by the search unit 102 or the path control unit 103, and use the information temporarily.

FIG. 3 is a figure showing details of the forwarding table 112. The forwarding table 112 includes forwarding table entries 112-1 and 112-2 or the like.

As mentioned above, the forwarding table entry indicates the processing rule, in which the processing to be performed for a header of the received packet of the switch 110 is written down. As the contents of the forwarding table entry, a VLAN-ID, a source MAC address, a destination MAC address, a content of process, an input port and an output port are included. Here, some among information indicated in a header of the received packet of the switch 110 are treated as the search keys when a search for the forwarding table 112 is performed. For example, it is possible that the VLAN-ID, the source MAC address and the destination MAC address are used as the search keys. The same processing will be performed to a packet defined by the same search key.

(Operation)

Figure 4:
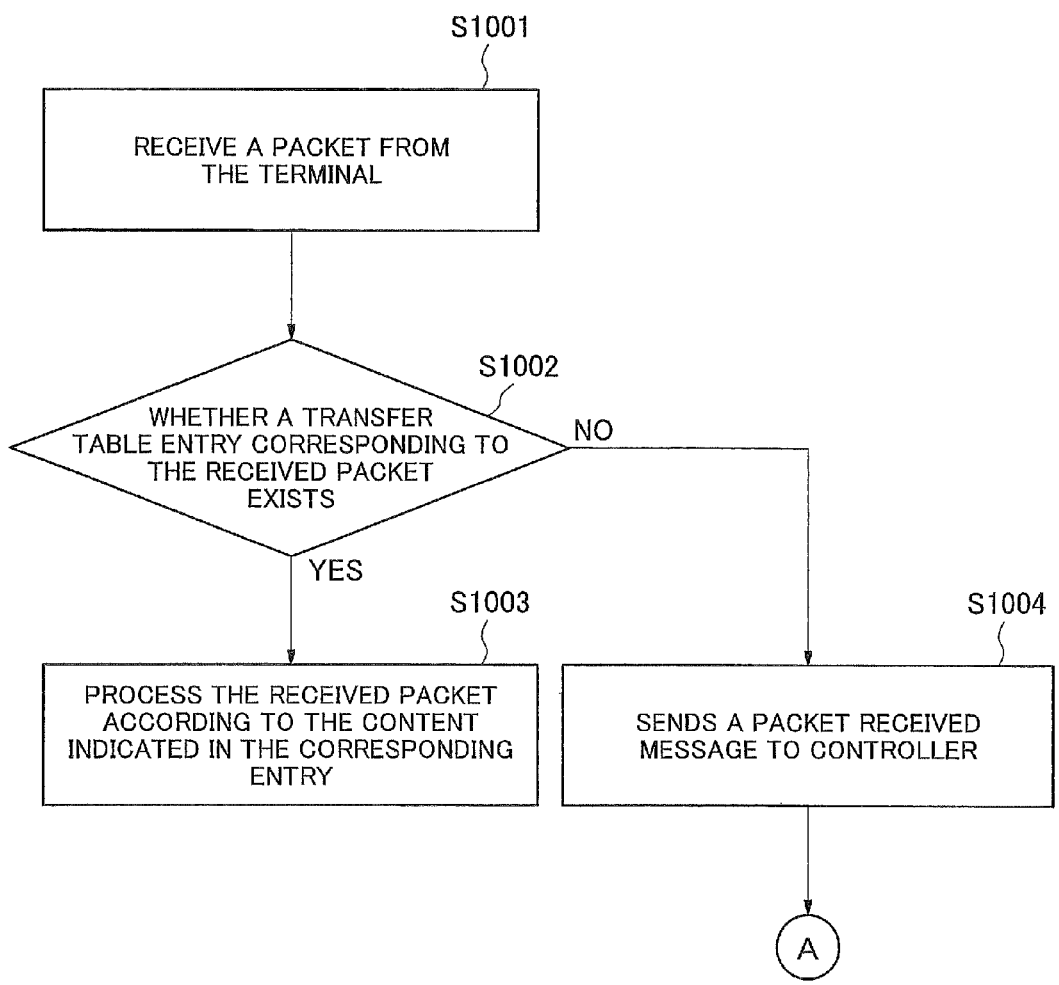
FIG. 4 is a flowchart showing operation of the first exemplary embodiment.
Figure 5:
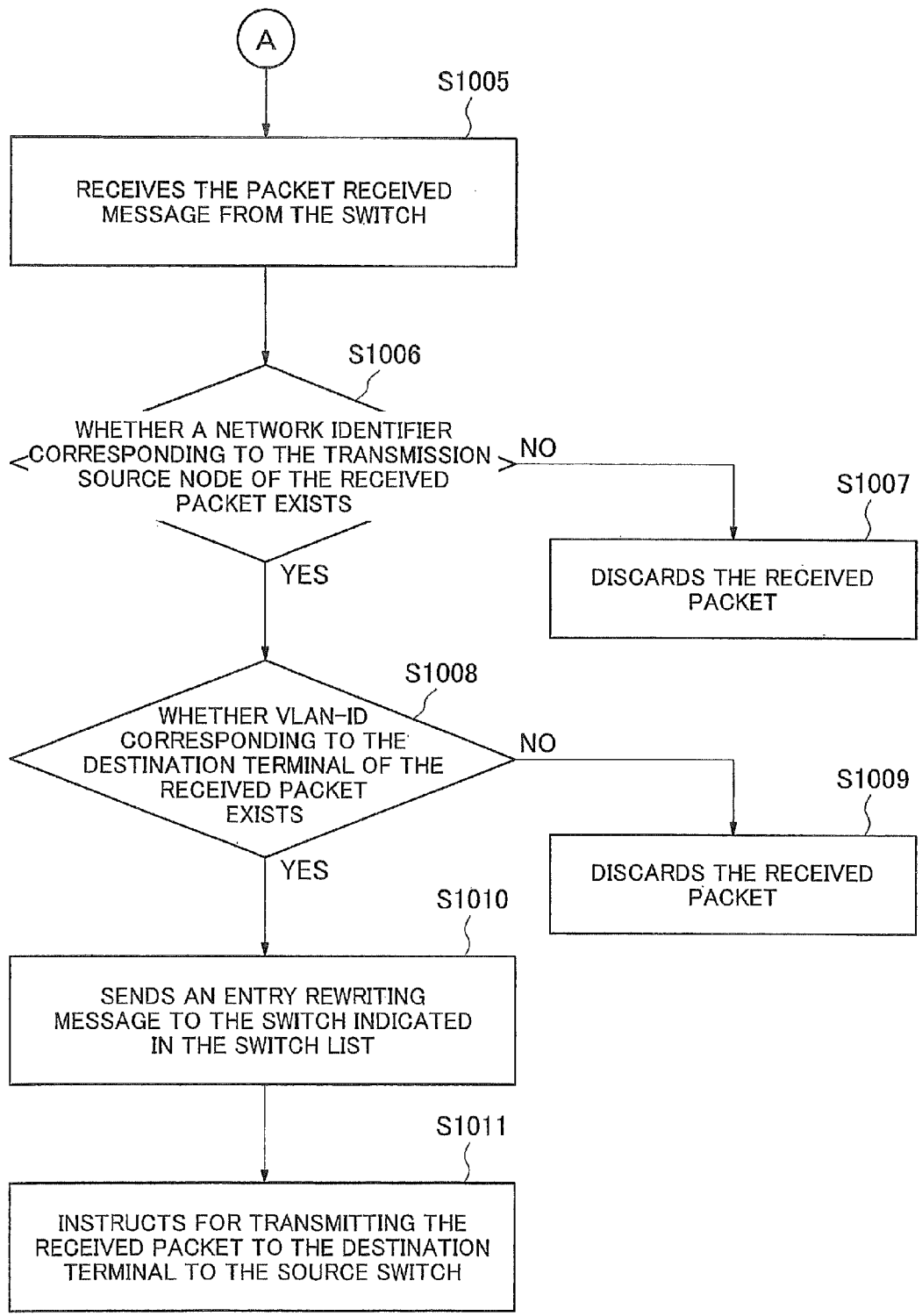
FIG. 5 is a flowchart showing operation of the first exemplary embodiment.

Next, operation of the first exemplary embodiment will be described in detail with reference to FIG. 4 and FIG. 5. As mentioned above, a case where communication is performed in a direction from the terminal 130 to the terminal 140 of FIG. 1 will be described. FIG. 4 is a flowchart showing operation of the switch 110. FIG. 5 is a flowchart showing operation of the controller 100.

First, operation of the switch 110 will be described with reference to FIG. 4. The switch 110 receives a packet from the terminal 130 (FIG. 4: Step S1001). Next, the packet transfer unit 111 refers to the forwarding table 112 and determines whether a forwarding table entry corresponding to the received packet exists (FIG. 4: Step S1002).

When it is determined that the forwarding table entry corresponding to the received packet exists in Step S1002, Step S1003 is performed. The packet transfer unit 111 deals with the received packet according to a content of process and an output port or the like indicated in the corresponding forwarding table entry (FIG. 4: Step S1003).

When it is determined that the forwarding table entry corresponding to the received packet does not exist in Step S1002, Step S1004 is performed. The packet transfer unit 111 sends a packet received message, which inquires for a report that it has received a packet for which a processing rule is unknown, to the controller 100. This packet received message includes information about the received packet including the header. Accordingly, it is also possible to send the received packet just as it is instead of the packet received message.

After Step S1004 has been performed, the controller 100 performs operation shown in FIG. 5. Hereinafter, operation of the controller 100 will be described with reference to FIG. 5.

First, the controller 100 receives the packet received message from the switch 110. (FIG. 5: Step S1005).

Next, the search unit 102 searches for whether a NW-ID corresponding to a source terminal (terminal 130) of the received packet exists from the network configuration information table 101 (FIG. 5: Step S1006). More specifically, the search unit 102 searches for the corresponding NW-ID using a VLAN-ID and a source MAC address of the received packet as the search keys.

When the NW-ID corresponding to the source terminal of the received packet does not exist in the network configuration information table 101 in Step S1006, it orders the switch 110 to discard the received packet (FIG. 5: Step S1007). When the controller 100 is receiving the received packet itself, not the packet received message, the controller 100 discards the received packet.

When the NW-ID corresponding to the source terminal of the received packet exists in the network configuration information table 101, and has been searched in Step S1006, Step S1008 is performed. The search unit 102 searches for whether there is a VLAN-ID corresponding to the destination terminal (terminal 140) of the received packet from the network configuration information table 101 (FIG. 5: Step S1008). More specifically, a destination MAC address of the received packet and the NW-ID having been searched in Step S1006 are used as the search keys for searching the corresponding VLAN-ID.

When the VLAN-ID corresponding to the destination terminal of the received packet does not exist in the network configuration information table 101 in Step S1008, it orders the switch 110 to discard the received packet (FIG. 5: Step S1009). When the controller 100 is receiving the received packet itself, not the packet received message like Step S1007, the controller 100 discards the received packet.

When the VLAN-ID corresponding to the destination terminal of the received packet exists in the network configuration information table 101, and has been searched in Step S1008, Step S1010 is performed. First, the path control part 103 searches for the switch list corresponding to the terminal (destination terminal), which has been found when the VLAN-ID was searched in Step S1008, from the network configuration information table 101. In the first exemplary embodiment, it is supposed that the switch 110 and the switch 120 are indicated. After that, an entry rewriting message is sent to each switch that is indicated in the searched switch list (FIG. 5: Step S1010). This entry rewriting message is an order to newly add an entry corresponding to the received packet to each entry of the forwarding table 112 of the switch 110 and the forwarding table 122 of the switch 120. The entry rewriting message includes a header (a VLAN-ID, a source MAC address and a destination MAC address) of the received packet, a content of process corresponding to the header, an input port and an output port.

The entry rewriting message will be described more in detail. To either of the switch 110 or the switch 120, the VLAN-ID of an entry which is to be newly added is rewritten by the VLAN-ID which has been searched in Step S1008. To the other switch of the switch 110 or the switch 120, the processing, which rewrites the VLAN-ID indicated in a header of the received packet by the VLAN-ID which has been searched in Step S1008 when the switch receives the corresponding packet, is set as a content of process. Further, when there are more than three switches, the entry rewriting message which is the same as message for the switch 120 may be sent to the switch to which the processing rule should be set other than the switch 120.

Finally, the controller 100 issues an instruction for sending the received packet to the destination terminal (terminal 140) to the source switch (the switch 110) of the entry rewriting message. When the controller 100 is receiving the received packet just as it is, not the packet received message, the received packet may be sent directly to the destination terminal (terminal 140) of the received packet (FIG. 5: Step S1011).

(Effects)

As described above, in the first exemplary embodiment, the controller 100 controls communication between terminals by holding configuration information so that a terminal, which belongs to a VLAN, may belong to a NW which is a different virtual network from the VLAN. By this configuration, this embodiment has the following effects;

(1) As far as the terminals belong in the same NW, it is possible to communicate between the terminals in which a VLAN-ID is different with each other. For example, each of the terminal 130 and the terminal 140 shown in FIG. 23 has different VLAN-ID, but they have an identical NW-ID. Even when communication between the terminal 130 and the terminal 140 is not established, it becomes possible to perform communication in the NW by control of the controller 100.

(2) An identical VLAN-ID can be used by a plurality of terminals, as far as the NW is different. For example, the terminal 131 and the terminal 140 shown in FIG. 23 have the identical VLAN-ID "2". Because the terminal 131 and the terminal 140 belong to the different NW respectively, it does not communicate each other unless the NW configuration is changed. Therefore, the terminal 131 and the terminal 140 can hold the identical VLAN-ID.

As it has been described by (1) and (2) above, establishment of a virtual network does not depend on a VLAN and a VLAN-ID because a NW and a NW-ID are used. Accordingly, the problem of number restriction of VLAN-ID can be eliminated. Because a VLAN-ID is not used for establishing a virtual network, a VLAN-ID can be used for multiplexing of a NIC (Network Interface Card) provided in each terminal.

<Second Exemplary Embodiment>

(Outline)

Next, the second exemplary embodiment of the present invention will be described in detail with reference to FIG. 6 and FIG. 7. A difference between the second exemplary embodiment and the first exemplary embodiment is in the information used by the controller at the time of searching for a NW-ID in which a source terminal of the received packet of the switch (FIG. 5: Step S1006) and in the information used at the time of searching for a VLAN-ID to which a destination terminal of the received packet belongs (FIG. 5: Step S1008).

(Configuration)

Figure 6:
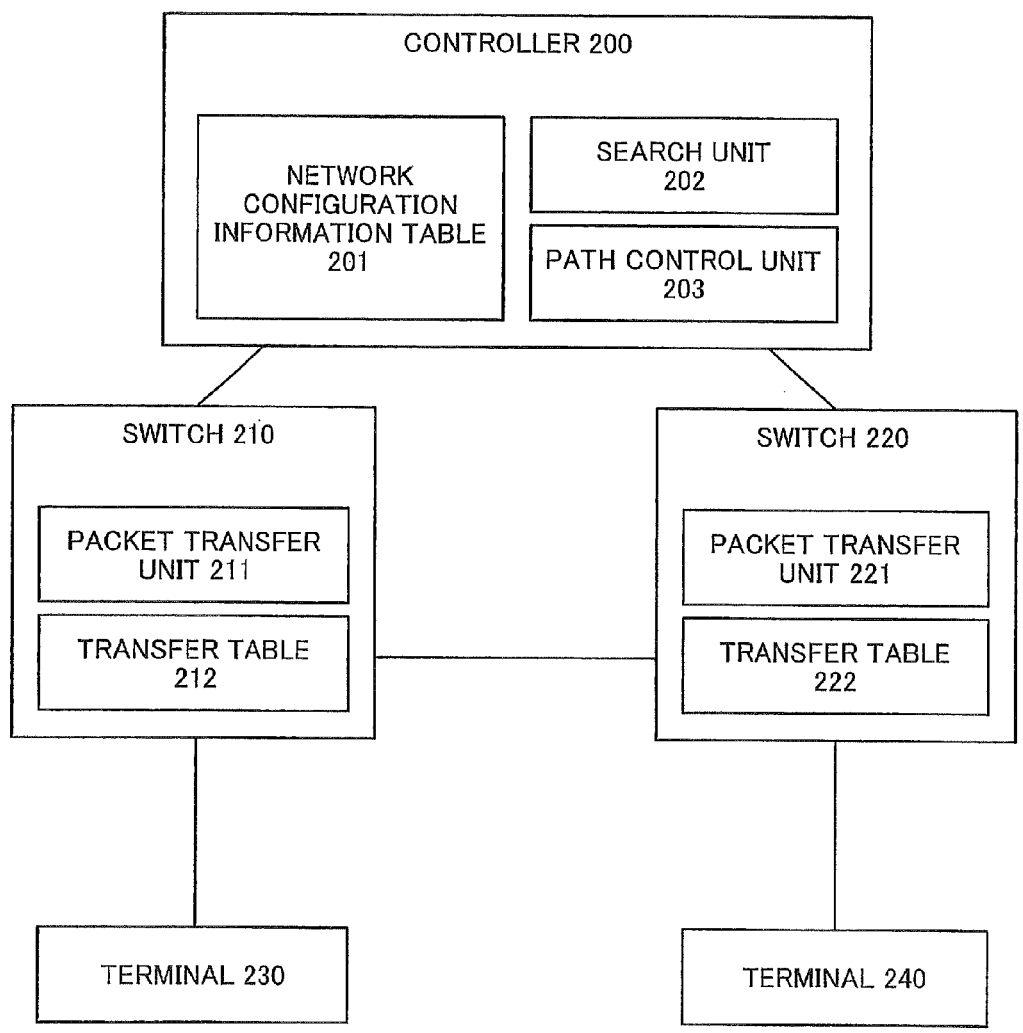
FIG. 6 is a block diagram showing the configuration of the second exemplary embodiment.

FIG. 6 is a block diagram showing the configuration of the system of the second exemplary embodiment. The system according to the second exemplary embodiment includes a controller 200, a switch 210, a switch 220, a terminal 230 and a terminal 240.

The controller 200 includes a network configuration information table 201, a search unit 202 and a path control part 203.

The switch 210 includes a packet transfer unit 211 and a forwarding table 212. Similarly, the switch 220 includes a packet transfer unit 221 and a forwarding table 222.

Further, because the configuration except for the network configuration information table 201 of the controller 200 is the same as that of the first exemplary embodiment, the description will be omitted here.

Hereinafter, the network configuration information table 201 will be described with reference to FIG. 7. FIG. 7 shows a detailed composition of the network configuration information table 201.

The network configuration information table 201 includes network configuration information entries 201-1 and 201-2 or the like. Each network configuration information entry holds information on a terminal in the network controlled by the controller 200. Accordingly, the network configuration information table 201 holds as many network configuration information entries as the number of terminals, N, similar to the first exemplary embodiment.

The network configuration information entry includes a VLAN-ID, a MAC (Media Access Control) address, an L3 (Layer 3) address, a NW-ID and a switch list. A difference from the first exemplary embodiment is that the L3 address is included in the network configuration information entry. L3 represents the third layer (the layer 3, or the network layer) of seven hierarchies of the OSI (Open Systems Interconnection) reference model. As a typical example of the L3 address, an IP address is mentioned.

Hereinafter, the network configuration information entry 201-1 will be described as an example. The network configuration information entry 201-1 is corresponding to the terminal 230 of FIG. 6. As mentioned above, the L3 address is added compared with the first embodiment in FIG. 2. The L3 address which is an identifier of the terminal 230 is stored in the "L3 address". Because other than the L3 address among the network configuration information entries, i.e., a VLAN-ID, a MAC address, a NW-ID and a switch list, are the same as those of the first exemplary embodiment, the description will be omitted.

(Operation)

As described above, the differences in operation of the second exemplary embodiment and the first exemplary embodiment are Step S1006 and Step S1008 of FIG. 5. Hereinafter, the differences in Step S1006 and Step S1008 will be described with reference to FIG. 5.

In Step S1006, the search unit 202 searches for whether a NW-ID corresponding to a source terminal (terminal 230) of the received packet exists from the network configuration information table 201. According to the second exemplary embodiment, the search unit 202 searches for the corresponding NW-ID using the L3 address of the source terminal (terminal 230) as a key in addition to the VLAN-ID of the received packet and the source MAC address.

When the NW-ID corresponding to the source terminal of the received packet exists in the network configuration information table 201 and has been searched in Step S1006, Step S1008 is performed. The search unit 202 searches for whether there is a VLAN-ID corresponding to the destination terminal (terminal 240) of the received packet from the network configuration information table 201 (FIG. 5: Step S1008). According to the second exemplary embodiment, the corresponding VLAN-ID is searched by using the L3 address of the destination terminal (terminal 240) as a key in addition to the destination MAC address of the received packet and the NW-ID searched in Step S1006.

(Effects)

The second exemplary embodiment has the same effects as those of the first exemplary embodiment as it has been described above.

<Third Exemplary Embodiment>

(Outline)

The third exemplary embodiment of the present invention will be described in detail with reference to the figures. The third exemplary embodiment will describe a case where the first exemplary embodiment is applied to the technology called OpenFlow (OF) described in the non patent literature 2.

(Configuration)

Figure 8:
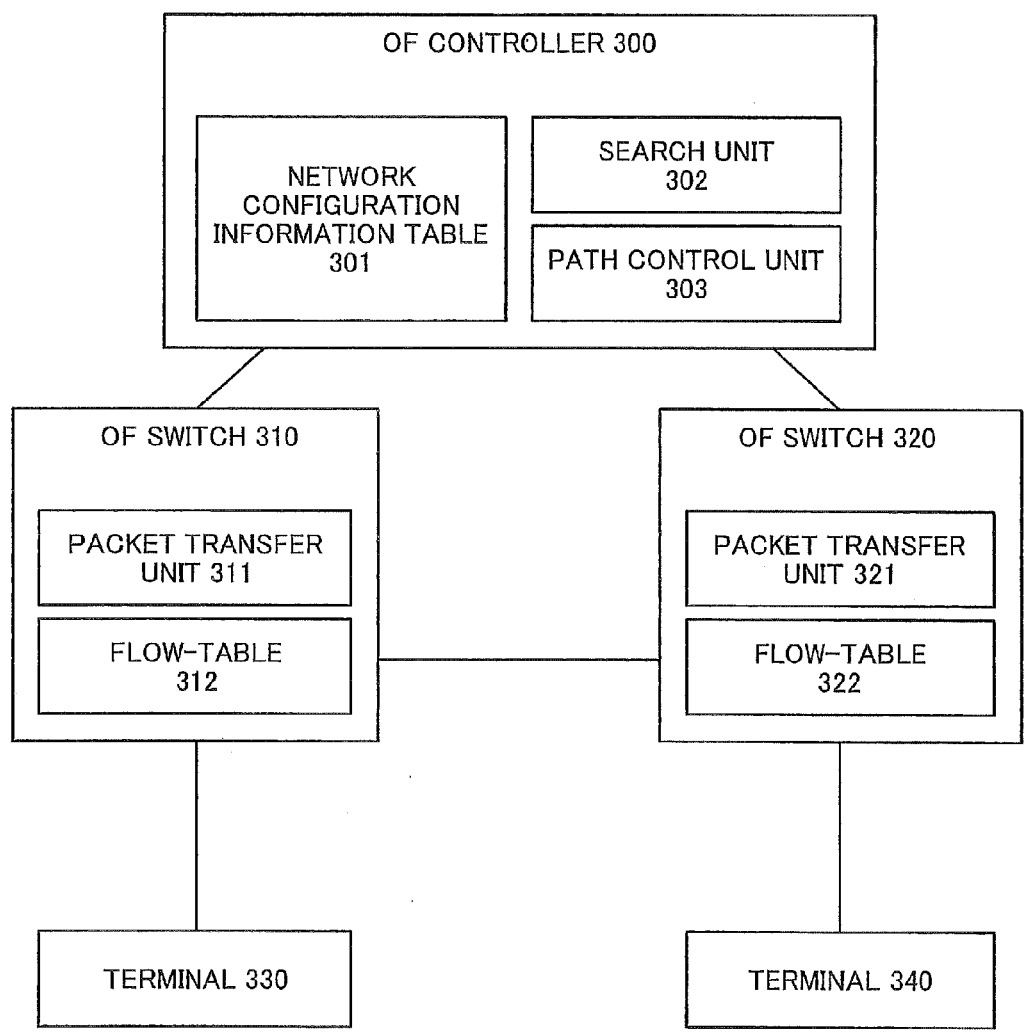
FIG. 8 is a block diagram showing the composition of the third exemplary embodiment.

The configuration of the third exemplary embodiment will be described with reference to FIGS. 8 to 10. FIG. 8 is a block diagram showing the configuration of the system according to the third exemplary embodiment.

According to FIG. 8, the system of the third exemplary embodiment includes an OF controller 300, an OF switch 310, an OF switch 320, a terminal 330 and a terminal 340.

The OF controller 300 includes a network configuration information table 301, a search unit 302 and a path control unit 303. The OF controller 300 is an apparatus which manages the OF switch 310, the OF switch 320, the terminal 330 and the terminal 340.

The network configuration information table 301 is a table which holds information on terminals (the terminal 330 and the terminal 340) in the network which is controlled by the OF controller 300. Detailed description will be made later (FIG. 9).

Based on information on a packet (hereinafter, "received packet") which each OF switch has received, the search unit 302 searches for a VLAN-ID to which a destination terminal of the received packet belongs, from the network configuration information table 301.

The path control unit 303 takes out a list of OF switches belonging to the same NW as a source terminal or a destination terminal of the received packet from the network configuration information table 301. Next, the path control unit 303 sets a processing rule (entry) to the switch which has been taken out so that communication between the source terminal and the destination terminal of the received packet may become possible.

The OF switch 310 includes a packet transfer unit 311 and a flow table 312. Similarly, the OF switch 320 includes a packet transfer unit 321 and a flow table 322.

The packet transfer unit 311 searches for the received packet, whether there is a processing rule corresponding to the received packet in the flow table 312. When there is a corresponding processing rule, the packet transfer unit 311 refers to a content of process indicated in the processing rule, and performs an "Action". The Action includes, for example, processing such as sending the packet to the OF switch 320 via a specific port (not shown in the figure), discarding the packet, rewriting the packet header and broadcasting the packets. When a processing rule corresponding to the received packet is not indicated in the flow table 312, the packet transfer unit 311 inquires the OF controller 300 which Action is to be performed.

The flow table 312 stores each entry as a processing rule by correlating the contents of information (a header) on the received packet of the OF switch 310 with the Action corresponding to the header of the received packet. As mentioned above, the packet transfer unit 311 performs the Action corresponding to the received packet. Detailed description will be made later in FIG. 10.

Further, because the packet transfer unit 321 and the flow table 322 of the OF switch 320 are similar to the packet transfer unit 311 and the flow table 312 of the OF switch 310, the description of these will be omitted. Although the number of switches shown in FIG. 8 is two, it is not limited to this and it operates similarly even in a case of more than three.

The terminal 330 performs packet communication with the terminal 340. Similarly, the terminal 340 performs packet communication with the terminal 330. Henceforth, although it will be described as the packet communication is to be performed in a direction from the terminal 330 to the terminal 340, it is not limited to this and it operates even in a case of an opposite direction.

FIG. 9 is a figure showing details of the network configuration information table 301. The network configuration information table 301 includes network configuration information entries 301-1 and 301-2 or the like. Each network configuration information entry holds information on terminals in the network controlled by the OF controller 300. Accordingly, the network configuration information table 301 holds as many network configuration information entries as the number of terminals, N.

The network configuration information entry includes a VLAN-ID, a MAC address, a NW-ID and a switch list. Hereinafter, the network configuration information entry 301-1 will be described as an example. The network configuration information entry 301-1 is corresponding to the terminal 330 of FIG. 8. An identifier of the VLAN to which the terminal 330 belongs is stored in the "VLAN-ID". A MAC address which is a specific identifier of the terminal 330 is stored in the "MAC address". Further, similarity to the first exemplary embodiment, a MAC address is used as a specific identifier of a terminal also in the third exemplary embodiment, however, it is not limited to this. For example, an IP address can be used.

An identifier of the NW to which the terminal 330 belongs is stored in the "NW-ID". Further, as the NW-ID, for example, a network address which is expressed by using a front half part of an IP address assigned to each terminal or an SSID or the like which is an identifier of a wireless LAN is mentioned. As far as it is different from an ID of the VLAN which is a virtual network, it is not limited to these and new identifiers can be set and used.

Finally, a list of the switches belonging to the NW to which the terminal 330 belongs is stored in the "switch list". This switch list is generated from information (a VLAN-ID, a MAC address and a NW-ID) on each switch that the OF controller 300 has collected. As other composition of the switch list, for example, a list of OF switches that exist on a calculated route obtained by calculating a transfer route of the received packet can be stored.

The switch list is not indispensable to the network configuration information table 301, similarly to the first exemplary embodiment. It is also possible that information on the switches managed by the OF controller 300 is collected whenever the network configuration information table 301 is searched by the search unit 302 or the path control unit 303, and use the information temporarily.

In FIG. 9, it shows an example which includes four kinds of information, a VLAN-ID, a MAC address, a NW-ID and a switch list in the network configuration information entry; however, it is possible to add an L3 address similar to the second exemplary embodiment. Because the configuration and operation in that case are almost the same as those of the second exemplary embodiment, the description will be omitted here.

FIG. 10 is a figure showing details of the flow table 312. The flow table 312 includes flow table entries 312-1 and 312-2 or the like.

As mentioned above, the flow table entry indicates the processing rule in which the processing to be performed for a header of the received packet of the switch 110 is written down. As the contents of the entry, a VLAN-ID, a source MAC address, a destination MAC address, an Action, an input port and an output port are included. Here, some among information indicated in a header of the received packet of the OF switch 310 are treated as the search keys when searching for the flow table 312. For example, it is possible that the VLAN-ID, the source MAC address and the destination MAC address are used as the search keys. The same Action will be performed to a packet defined by the same search key.

(Operation)

Figure 11:
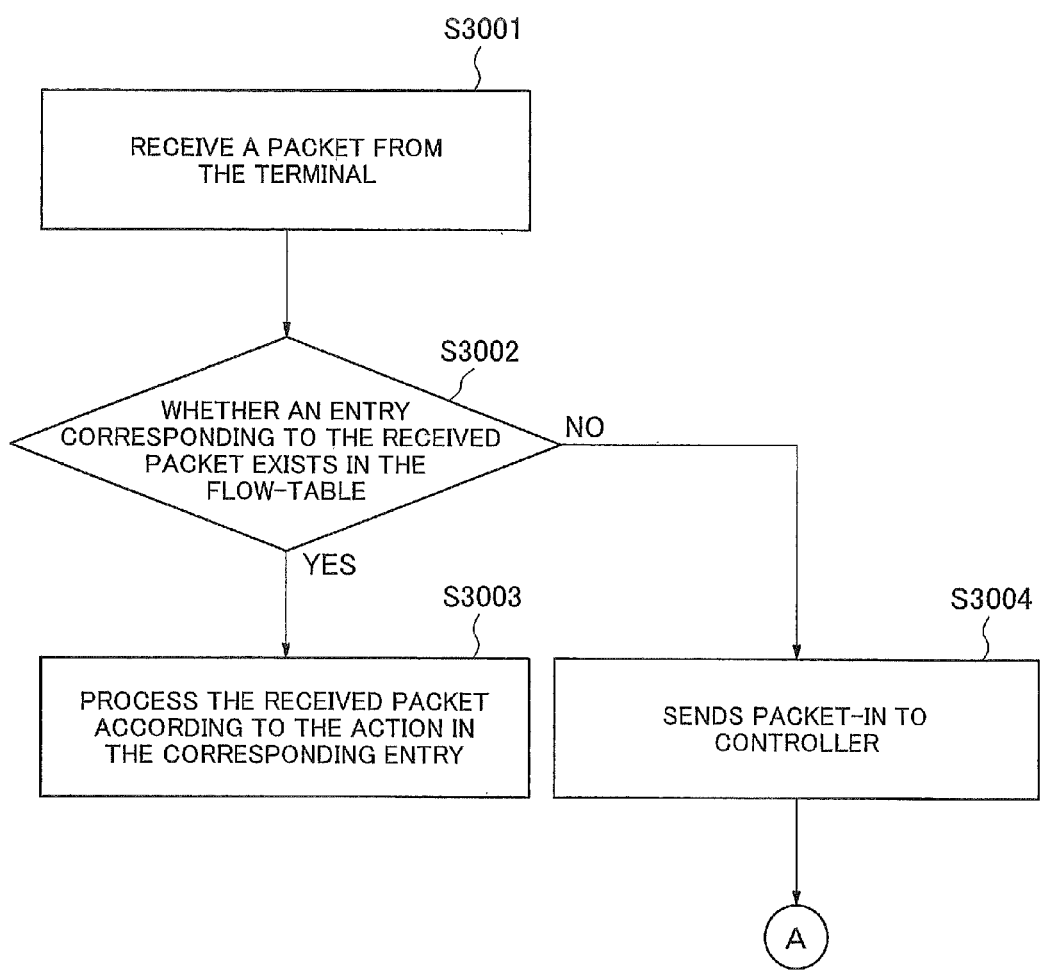
FIG. 11 is a flowchart showing operation of the third exemplary embodiment.
Figure 12:
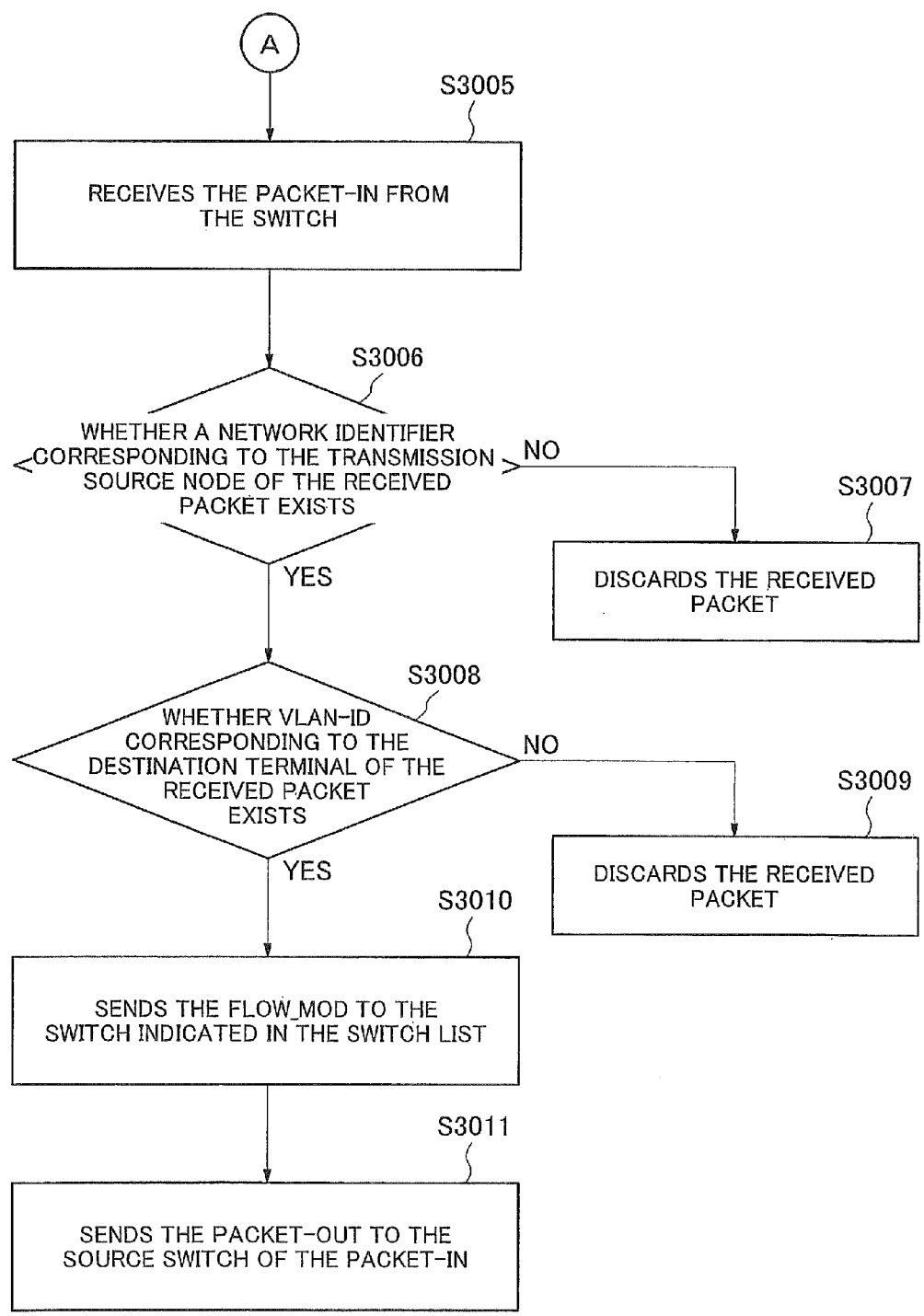
FIG. 12 is a flowchart showing operation of the third exemplary embodiment.

Next, operation of the third exemplary embodiment will be described in detail with reference to FIG. 11 and FIG. 12. As mentioned above, a case where communication is performed in a direction from the terminal 330 to the terminal 340 of FIG. 8 will be described hereinafter. FIG. 11 is a flowchart showing operation of the OF switch 310. FIG. 12 is a flowchart showing operation of the OF controller 300.

First, operation of the OF switch 310 will be described with reference to FIG. 11. The OF switch 310 receives a packet from the terminal 330 (FIG. 11: Step S3001). Next, the packet transfer unit 311 refers to the flow table 312 and determines whether a flow table entry corresponding to the received packet exists (FIG. 11: Step S3002).

When it is determined that the flow table entry corresponding to the received packet exists in Step S3002, Step S3003 is performed. The packet transfer unit 311 deals with the received packet according to a content of process and an output port or the like indicated in the corresponding flow table entry (FIG. 11: Step S3003).

When it is determined that the flow table entry corresponding to the received packet does not exist in Step S3002, Step S3004 is performed. The packet transfer unit 311 sends a message to the OF controller 300 to notify that it has received a packet for which a processing rule is unknown. This message is called "Packet-in" in the non patent literature 2. This Packet-in includes information about the received packet including a header. Accordingly, it is also possible to send the received packet just as it instead of the Packet-in.

When Step S3004 is performed, the OF controller 300 performs operation shown in FIG. 12. Hereinafter, operation of the OF controller 300 will be described with reference to FIG. 12.

First, the OF controller 300 receives the Packet-in from the OF switch 310. (FIG. 12: Step S3005).

Next, the search unit 302 searches for whether a NW-ID corresponding to a source terminal (terminal 330) of the received packet exists from the network configuration information table 301 (FIG. 12: Step S3006). More specifically, the search unit 302 searches for the corresponding NW-ID using a VLAN-ID and a source MAC address of the received packet as the keys.

When the NW-ID corresponding to the source terminal of the received packet does not exist in the network configuration information table 301 in Step S3006, it orders the OF switch 310 to discard the received packet (FIG. 12: Step S3007). When the OF controller 300 is receiving the received packet itself, not the Packet-in, the OF controller 300 discards the received packet.

When the NW-ID corresponding to the source terminal of the received packet exists in the network configuration information table 301 and has been searched in Step S3006, Step S3008 is performed. The search unit 302 searches for whether there is a VLAN-ID corresponding to the destination terminal (terminal 340) of the received packet from the network configuration information table 301 (FIG. 12: Step S3008). More specifically, a destination MAC address of the received packet and the NW-ID having been searched in Step S3006 are used as the keys for searching the corresponding VLAN-ID.

When the VLAN-ID corresponding to the destination terminal of the received packet does not exist in the network configuration information table 301 in Step S3008, it orders the OF switch 310 to discard the received packet (FIG. 12: Step S3009). More specifically, the order means that it orders the OF switch 310 to set an entry including the Action in which processing to discard the received packet is written.

In the non patent literature 2, such order is set to the OF switch by a message called "flow_mod". This flow_mod is a message from the OF controller, which is for setting an entry in the flow table to the OF switch. For example, an initial registration, change, overwriting and deletion are included in setting of the flow table entry.

When the OF controller 300 is not receiving the Packet-in and is receiving the received packet itself like Step S3007, the OF controller 300 discards the received packet.

When the VLAN-ID corresponding to the destination terminal of the received packet exists in the network configuration information table 301 and has been searched in Step S3008, Step S3010 is performed. First, the path control unit 303 searches for the OF switch list corresponding to the terminal (a destination terminal), which has been found when the VLAN-ID was searched in Step S3008 from the network configuration information table 301. In the third exemplary embodiment, it is supposed that the OF switch 310 and the OF switch 320 are indicated. After that, the flow_mod is sent to each OF switch that is indicated in the searched OF switch list (FIG. 12: Step S3010). The flow_mod is sent in order to newly add an entry corresponding to the received packet to the entry of the flow table 312 of the OF switch 310 and the entry of the flow table 322 of the OF switch 320.

The flow_mod sent in Step S3010 will be described more in detail. To either of the OF switch 310 or the OF switch 320, a VLAN-ID of an entry which is to be newly added is rewritten by the VLAN-ID which has been searched in Step S3008. To the other switch of the OF switch 310 or the OF switch 320, the processing, which rewrites a VLAN-ID indicated in a header of the received packet by the VLAN-ID which has been searched in Step S3008 when the OF switch receives the corresponding packet, is set as an Action. Further, when there are more than three switches, the flow_mod which is the same flow_mod for the OF switch 320 may be sent to the OF switch to which the processing rule should be set other than the OF switch 320.

Finally, the OF controller 300 issues an order for sending the received packet to the destination terminal (terminal 340) to the source switch (the switch 310) of the packet-in. This order corresponds to a message called Packet-out in the non patent literature 2. When the OF controller 300 is receiving the received packet just as it is, not the Packet-in, the received packet may be sent directly to the destination terminal (terminal 340) of the received packet (FIG. 12: Step S3011).

(Example of Operation)

Hereinafter, an example of operation of the third exemplary embodiment will be described in detail with reference to FIGS. 13 to 21.

Figure 13:
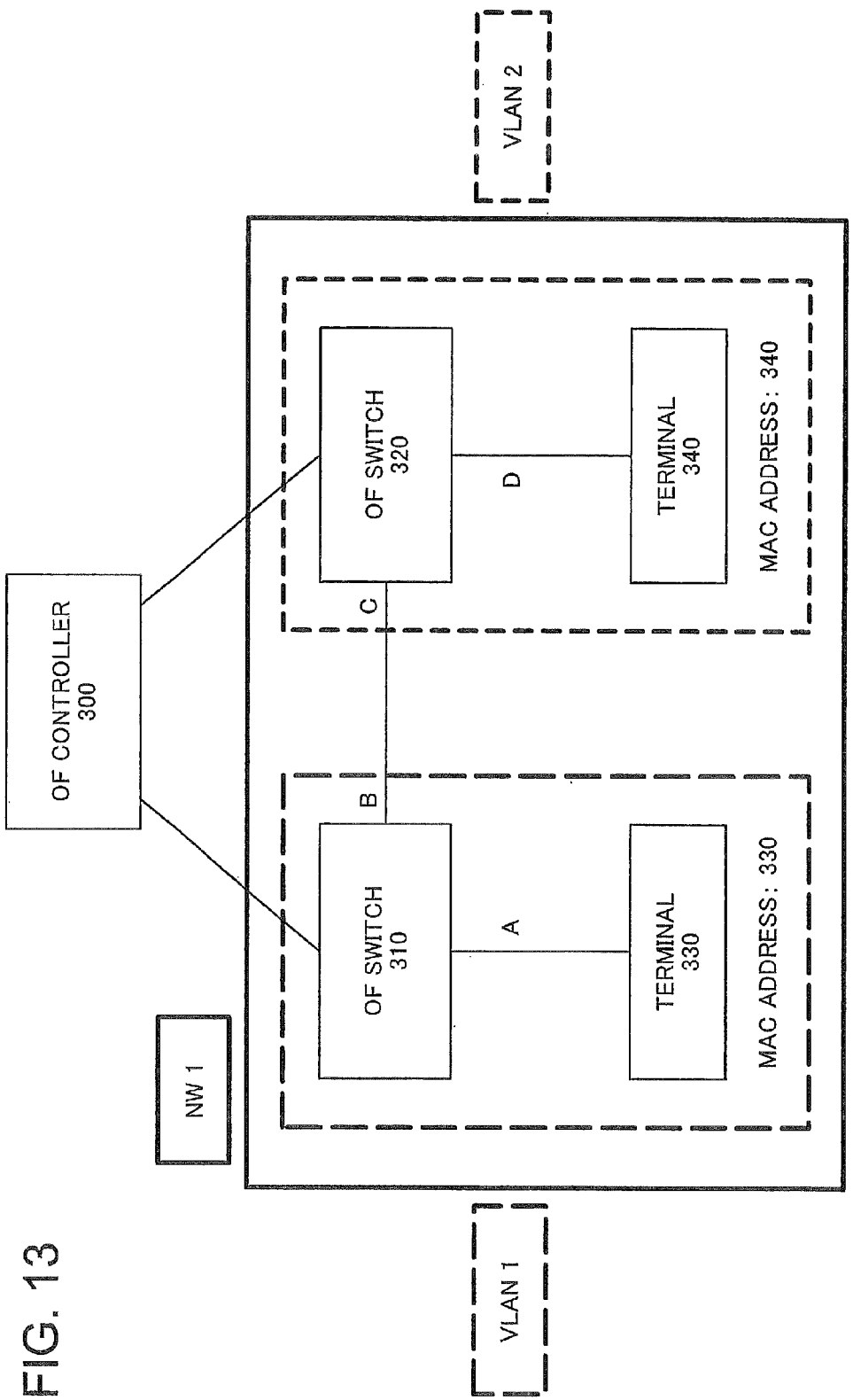
FIG. 13 is a figure showing a specific example of the third exemplary embodiment.

FIG. 13 shows the system configuration for this example of operation. The system shown in FIG. 13 includes the OF controller 300, the OF switch 310, the OF switch 320, the terminal 330 and the terminal 340.

The OF switch 310, the OF switch 320, the terminal 330 and the terminal 340 are included in the network 1 (NW1) as shown in FIG. 13. It is supposed the OF switch 310 and the terminal 330 are included in the VLAN1 and that the OF switch 320 and the terminal 340 are included in the VLAN2 respectively. The MAC address of the terminal 330 is set as "330", and the MAC address of the terminal 340 is set as "340" respectively. Further, in this example of operation, for the sake of simplicity, it shows operation in a case where a number of NW is one.

A, B, C or D indicated in FIG. 13 expresses a port of each OF switch. The port A of the OF switch 310 connects with the terminal 330. The port B of the OF switch 310 connects with the OF switch 320. The port C of the OF switch 320 connects with the OF switch 310. The port D of the OF switch 320 connects with the terminal 340.

Here, in FIG. 13, although it shows a configuration in a case where the OF controller 300 is not included in the NW1, it can be included in the NW1. The OF controller 300, the OF switch 310 and the OF switch 320 can be connected via a dedicated network, or the OF controller 300 can be connected via the network (NW1) which links the OF switch 310 and the OF switch 320 together.

Figure 14:
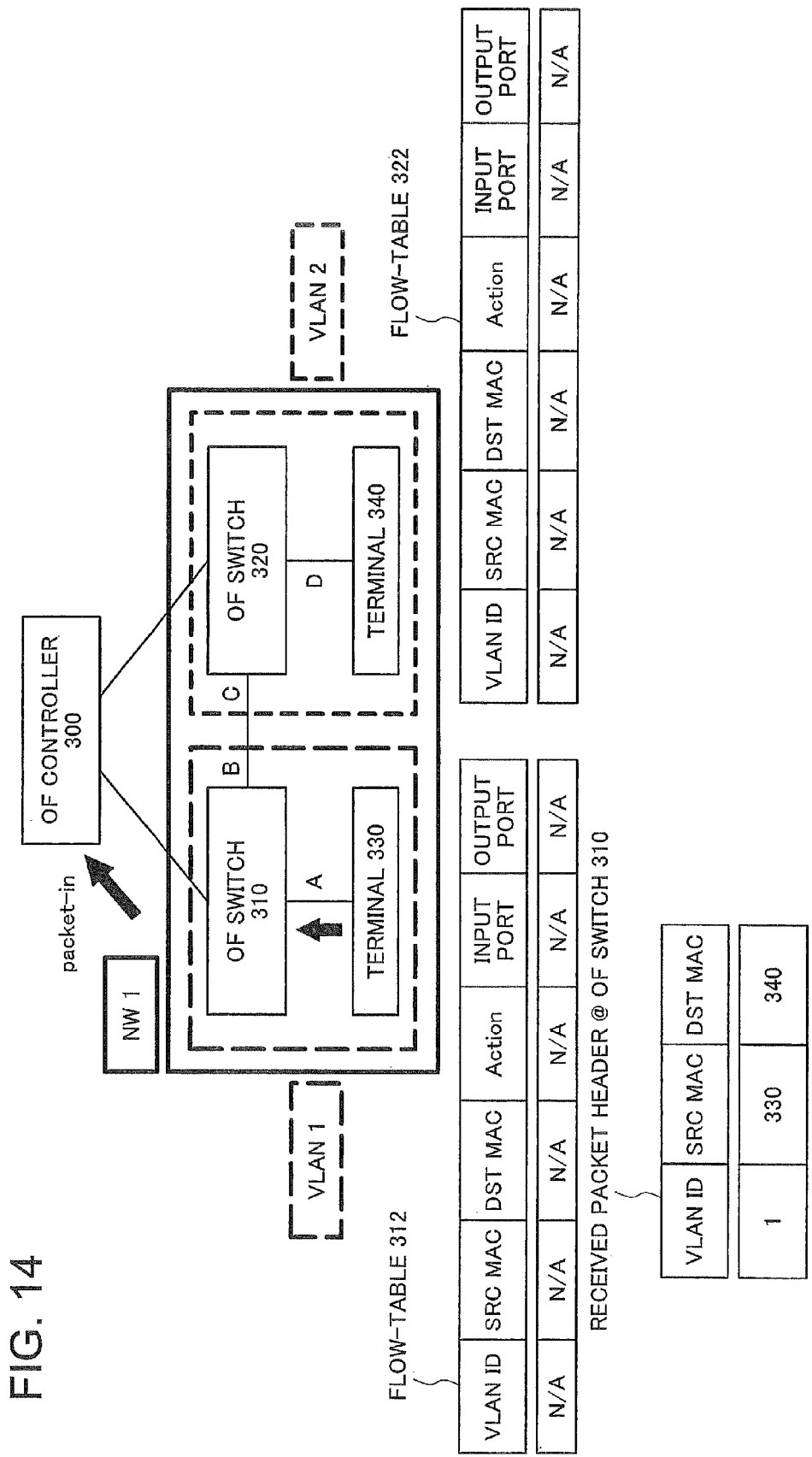
FIG. 14 is a figure showing a specific example of the third exemplary embodiment.

FIG. 14 shows an example of operation of Step S3001, Step S3002 (FIG. 11), Step S3004 and Step S3005 (FIG. 12) of the third exemplary embodiment.

In addition to FIG. 13, it shows the contents of the flow table 312, the flow table 322 and a header of the packet received by the OF switch 310. It is supposed that the entry corresponding to the received packet has not been written in both of the flow table 312 and the flow table 322 yet.

First, the terminal 330 sends a packet having a destination address of the terminal 340. In a header of this packet, "1" as a VLAN-ID to which the terminal 330 belongs, "330" of the terminal 330 as the source MAC address and "340" of the terminal 340 as the destination MAC address are written respectively.

The packet transfer unit 311 of the OF switch 310 that has received this packet searches for whether there is an entry corresponding to the received packet in the flow table 312 (FIG. 11: Step S3001 and Step S3002). Because there is no corresponding entry in the flow table 312, the packet transfer unit 311 inquires a content of process to the OF controller 300 using the packet-in (FIG. 11: Step S3004). Then, the OF controller 300 receives this packet-in (FIG. 12: Step S3005).

Figure 15:
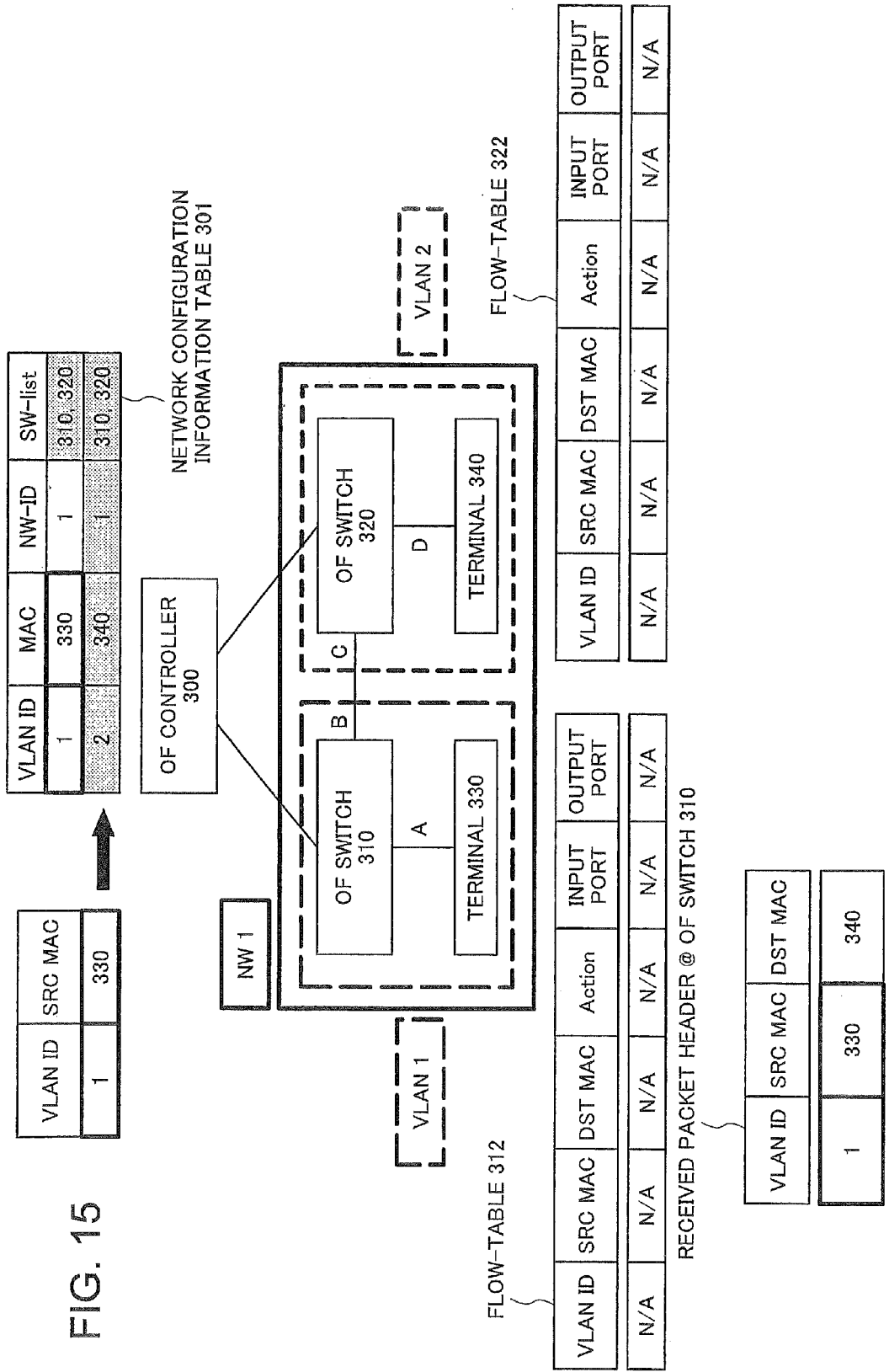
FIG. 15 is a figure showing a specific example of the third exemplary embodiment.
Figure 16:
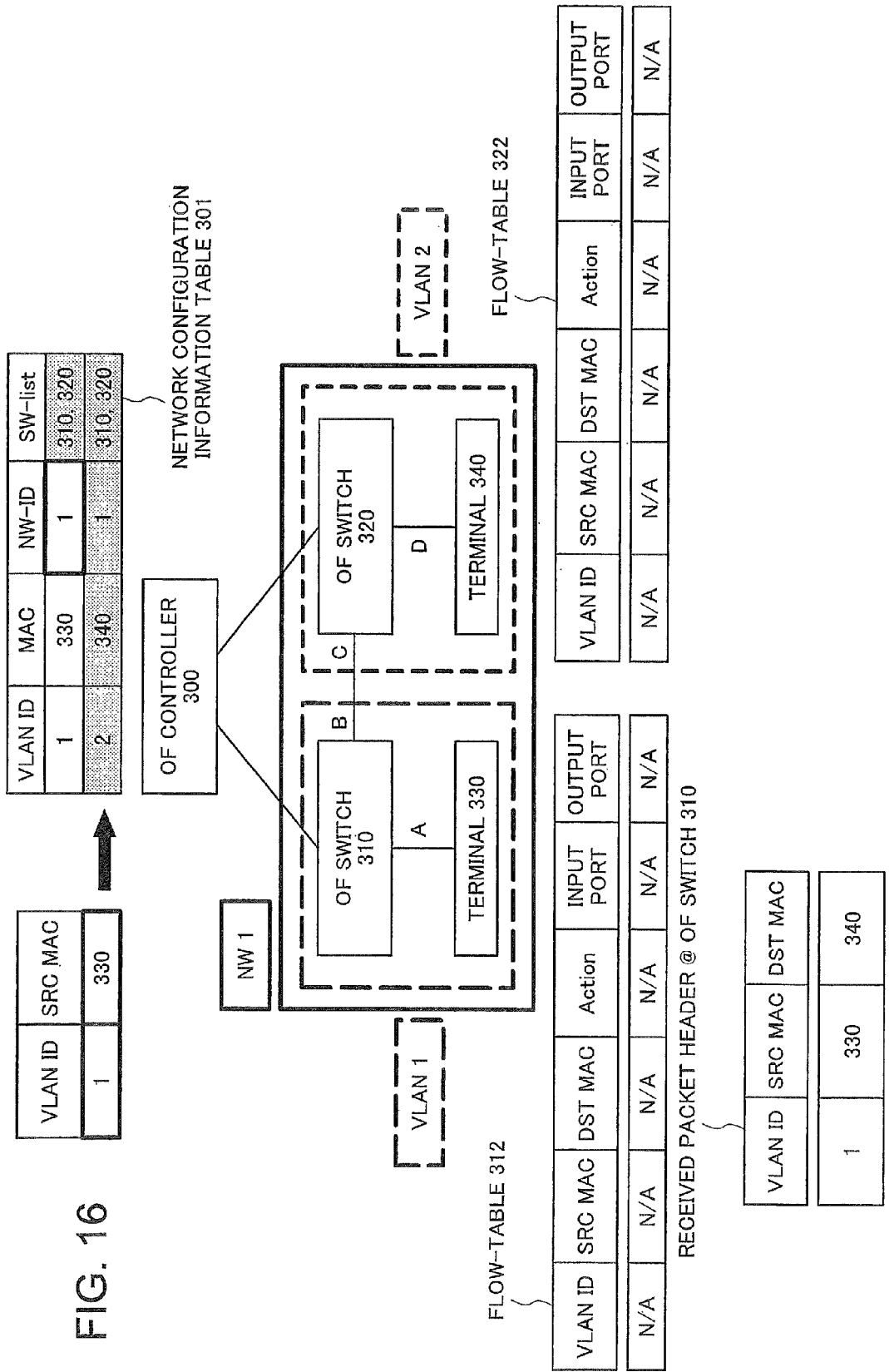
FIG. 16 is a figure showing a specific example of the third exemplary embodiment.

FIG. 15 and FIG. 16 show an example of operation of Step S3006 of the third exemplary embodiment. FIG. 15 and FIG. 16 show the contents of the network configuration information table 301 held in the OF controller 300, in addition to FIG. 14.

In this example of operation, entries corresponding to the terminal 330 and the terminal 340 are stored as entires in the network configuration information table 301.

In the entry corresponding to the terminal 330, it stores "1" as a VLAN-ID, "330" as a MAC address, "1" as a NW-ID and "310 and 320" as a switch list (SW-list) respectively.

Similarly, in the entry corresponding to the terminal 340, it stores "2" as a VLAN-ID, "340" as a MAC address, "1" as a NW-ID and "310 and 320" as a switch list respectively.

The search unit 302 of the OF controller 300 searches for the corresponding NW-ID from the network configuration information table 301 using the VLAN-ID (1) of the received packet and the source MAC address (330) as the keys in Step S3006.

As a result of this search, the NW-ID "1" to which the terminal 330 belongs can be obtained from the network configuration information table 301 (FIG. 16).

Figure 17:
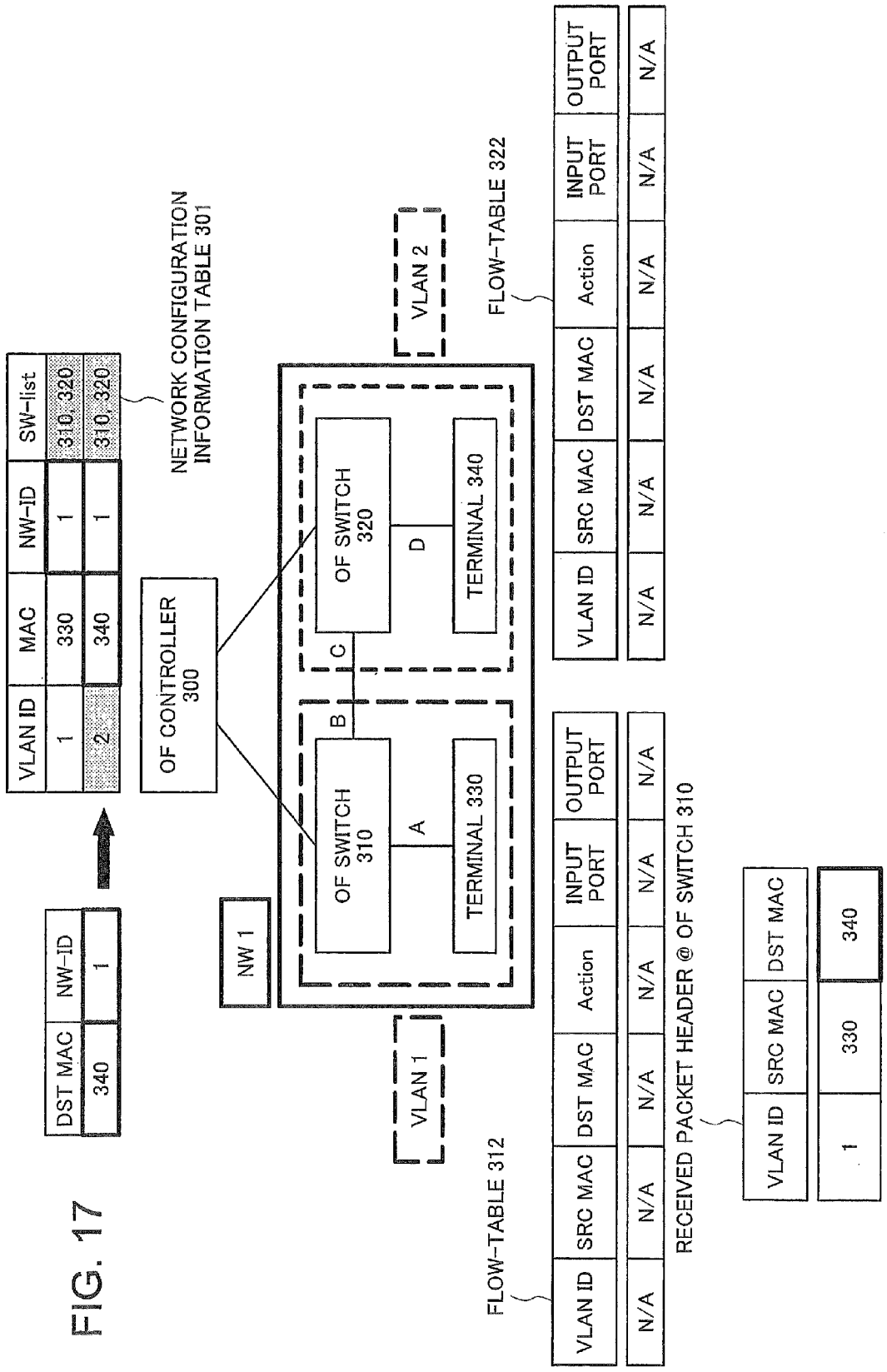
FIG. 17 is a figure showing a specific example of the third exemplary embodiment.
Figure 18:
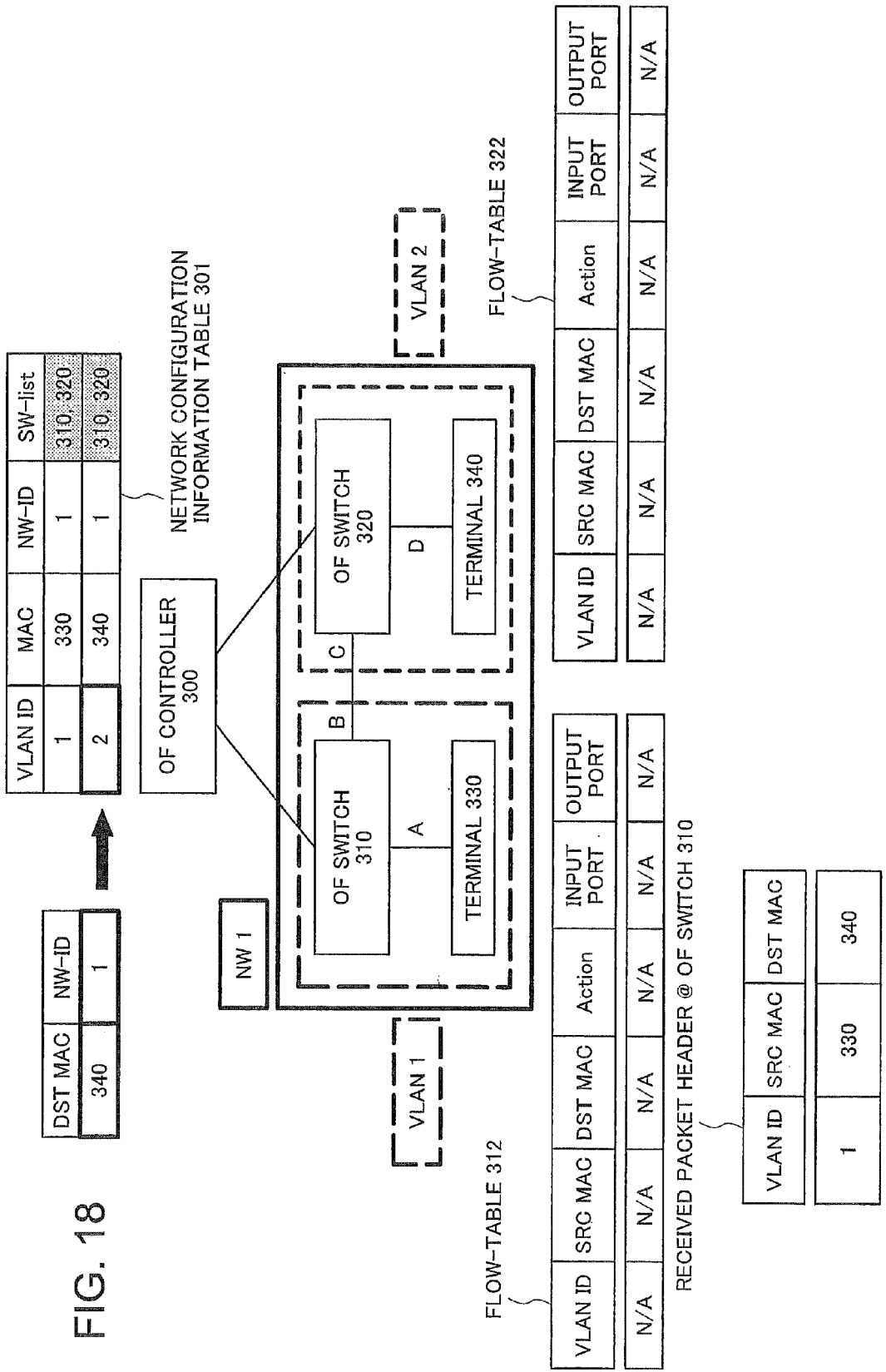
FIG. 18 is a figure showing a specific example of the third exemplary embodiment.

FIG. 17 and FIG. 18 show an example of operation of Step S3008 of the third exemplary embodiment. In Step S3008, the search unit 302 searches for the corresponding VLAN-ID using the destination MAC address (340) of the received packet and the NW-ID (1) which has been obtained in Step S3006 as the keys (FIG. 17). As a result, "2" as the VLAN-ID can be obtained (FIG. 18).

Figure 19:
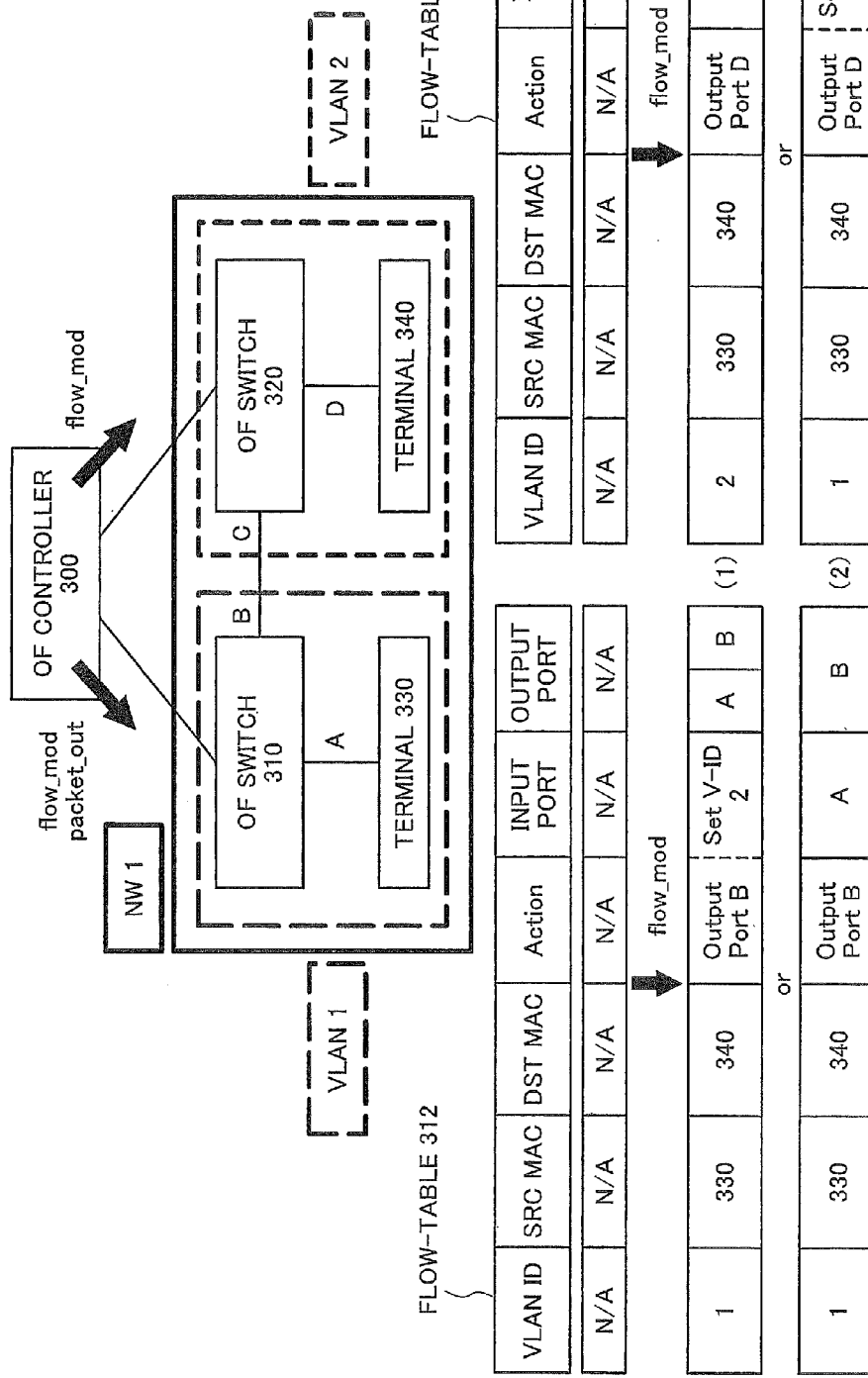
FIG. 19 is a figure showing a specific example of the third exemplary embodiment.

FIG. 19 shows an example of operation of Step S3010 and Step S3011 of the third exemplary embodiment.

First, the path control unit 303 of the OF controller 300 searches for the OF switch list, which is corresponding to the terminal (a destination terminal) found at the time when the VLAN-ID has been searched in Step S3008, from the network configuration information table 301. In this case, "310" and "320" are stored as the switch list.

After that, the flow_mod is sent to each switch indicated in the switch list (FIG. 12: Step S3010). This flow_mod is sent in order to newly add an entry corresponding to the received packet to each entry of the flow table 312 of the OF switch 310 and the flow table 322 of the OF switch 320. The following two kinds are considered as the contents of this flow_mod.

(1) It sets "1" as the VLAN-ID, "330" as the source MAC address, "340" as the destination MAC address, "outputs to the port B" and "rewrites a VLAN-ID of the packet by 2" as the contents of process, "A" as the input port, and "B" as the output port respectively to the flow table 312 of the OF switch 310. At the same time, it sets "2" as the VLAN-ID, "330" as the source MAC address, "340" as the destination MAC address, "outputs to the port D" as the content of process, "C" as the input port, and "D" as the output port respectively to the flow table 322 of the OF switch 320.

Thus, by setting as above, the VLAN-ID of the packet is rewritten by "2" from "1" when the OF switch 310 receives the relevant packet, and it becomes possible to communicate with the terminal 340 which belongs to the VLAN-ID "2".

(2) It sets "1" as the VLAN-ID, "330" as the source MAC address, "340" as the destination MAC address, "outputs to the port B" as the content of process, "A" as the input port, and "B" as the output port respectively to the flow table 312 of the OF switch 310. It sets "1" as the VLAN-ID, "330" as the source MAC address, "340" as the destination MAC address, "outputs to the port D" and "rewrites a VLAN-ID of the packet by 2" as the contents of process, "C" as the input port, and "D" as the output port respectively to the flow table 322 of the OF switch 320.

Thus, by setting as above, it becomes possible to communicate from the OF switch 310 to the OF switch 320 without rewriting the VLAN-ID of the relevant packet from "1". Also, it becomes possible to communicate with the terminal 340 which belongs to the VLAN-ID "2" by rewriting the VLAN-ID of the packet by "2" at the OF switch 320.

Finally, in Step S3011, the OF controller 300 sends the Packet-out to the OF switch 310, and orders to send the received packet to the destination terminal.

Figure 20:
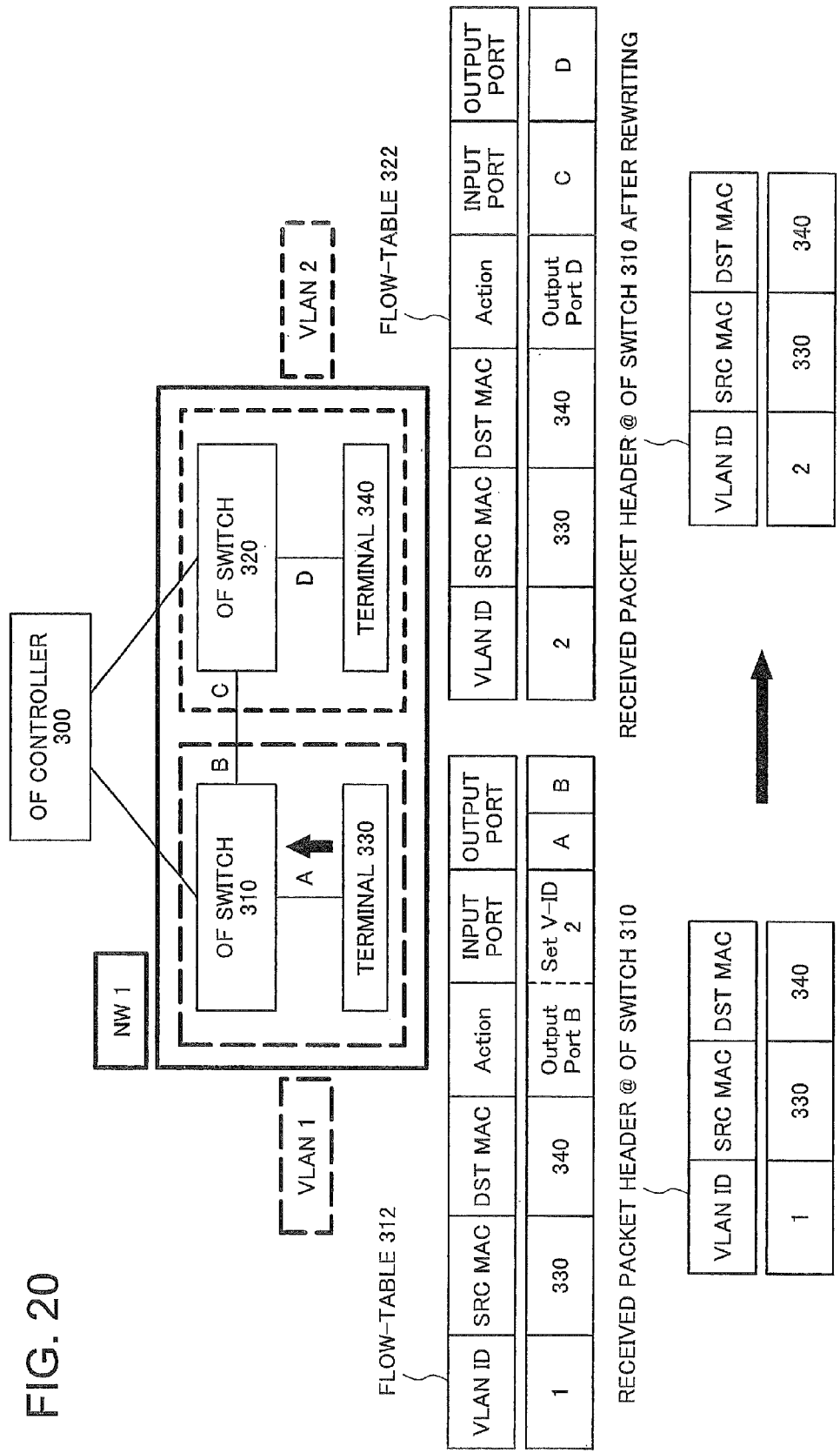
FIG. 20 is a figure showing a specific example of the third exemplary embodiment.
Figure 21:
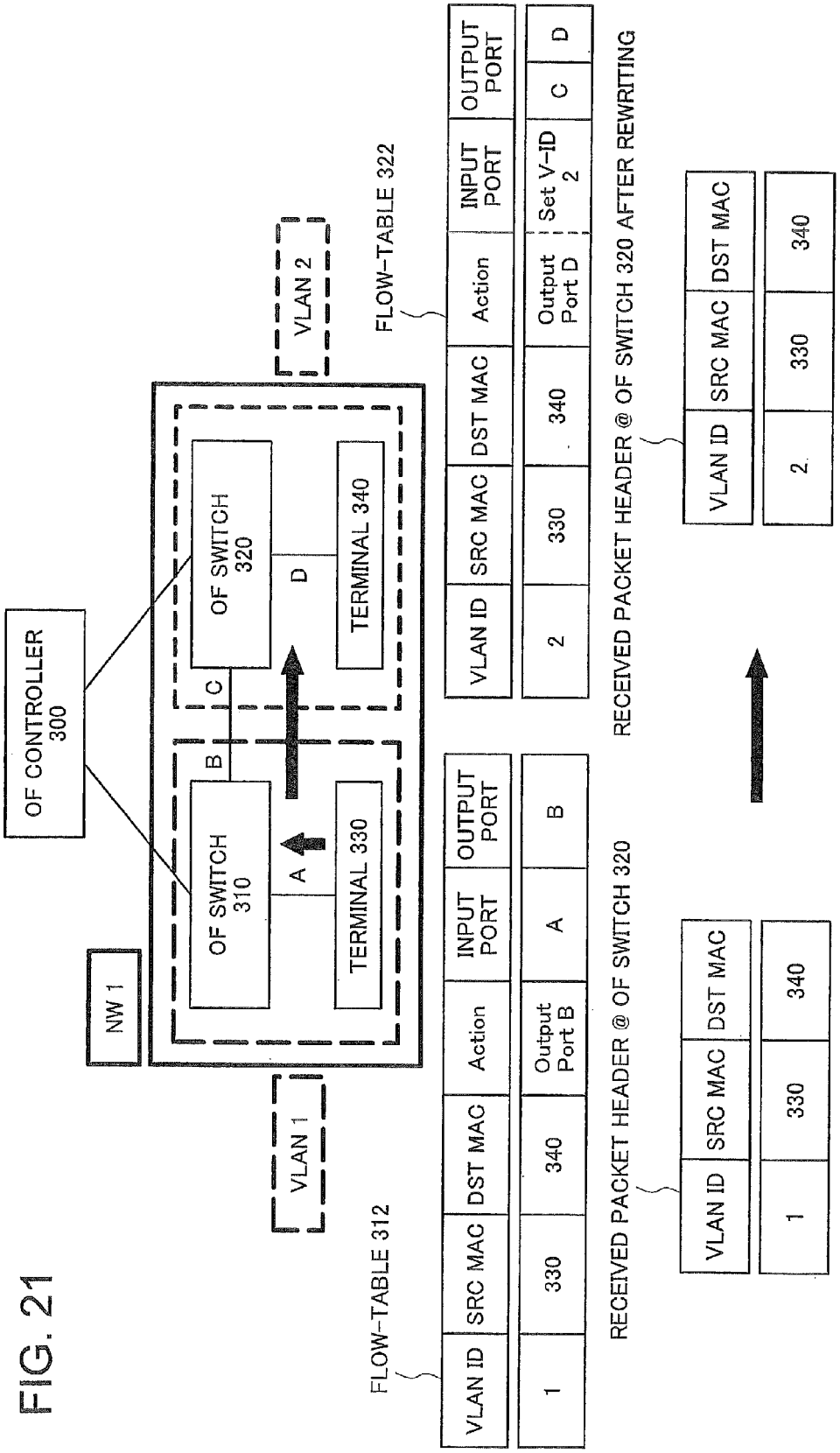
FIG. 21 is a figure showing a specific example of the third exemplary embodiment.

FIG. 20 and FIG. 21 show an example of operation after the flow table 312 and the flow table 322 have been updated by the operation mentioned above. |FIG. 20|[S1] shows an example of operation when each flow table has been updated as (1) of FIG. 19 by the flow_mod in Step S3010. FIG. 21 shows an example of operation when each flow table has been updated as (2) of FIG. 19 by the flow_mod in Step S3010.

In an example of FIG. 20, first, when the OF switch 310 has received the relevant packet, the flow table 312 is searched. In the corresponding entry of the flow table 312, it shows "Set V-ID 2" as the Action, in other words, to rewrite the VLAN-ID by 2. According to this, the VLAN-ID of the received packet header is rewritten by 2. After that, in the OF switch 320, transmission is performed to the terminal 340 according to the corresponding entry of the flow table 322.

Communication between different VLANs becomes possible by performing this rewriting of VLAN-ID in the OF switch 310 which belongs to the VLAN (1).

In an example of FIG. 21, first, when the OF switch 310 has received the relevant packet, the flow table 312 is searched. Because the corresponding entry exists in the flow table 312, the OF switch 310 sends the received packet to the OF switch 320 according to the entry.

Next, when the OF switch 320 has received the relevant packet, the flow table 322 is searched and the VLAN-ID of the received packet is rewritten by 2 according to "Set V-ID 2" indicated in the Action.

In the example of FIG. 21, it becomes possible to communicate between different VLANs by setting the VLAN-ID of the relevant entry of the flow table 322 to "1" in advance.

(Effects)

The third exemplary embodiment has the same effects as those of the first exemplary embodiment as it has been described above.

<Fourth Exemplary Embodiment>

The fourth exemplary embodiment of the present invention will be described in detail with reference to FIG. 22.

(Configuration)

The configuration of the fourth exemplary embodiment will be described with reference to FIG. 22. FIG. 22 is a block diagram showing the system configuration according to the fourth exemplary embodiment.

Figure 22:
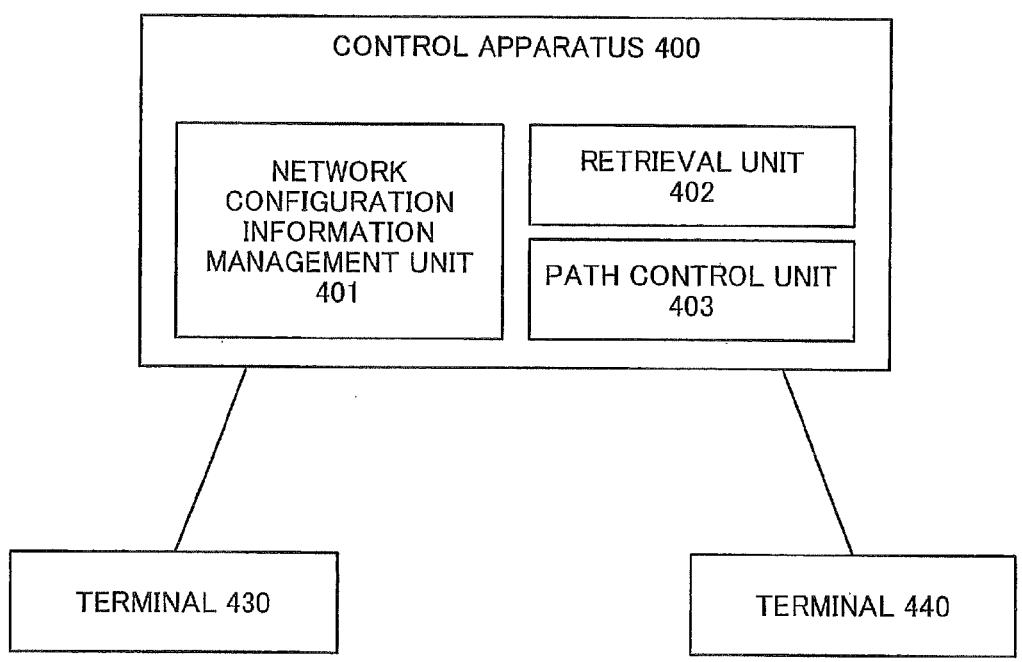
FIG. 22 is a block diagram showing the configuration of the fourth exemplary embodiment.

According to FIG. 22, the system of the fourth exemplary embodiment includes a control apparatus 400, a terminal 430 and a terminal 440.

The control apparatus 400 includes a network configuration information management unit 401 and a path control unit 403. The control apparatus 400 is an apparatus which controls communication (packet transferring) performed between the terminal 430 and the terminal 440.

The terminal 430 and the terminal 440 belong to the first virtual network identified by the first identifier respectively.

The network configuration information management unit 401 holds configuration information on the second virtual network so that the terminal 430 and the terminal 440 may belong to the second virtual network identified by the second identifier.

The path control unit 403 controls communication between each terminal based on configuration information on the second virtual network held by the network configuration information management unit 401.

(Effects)

According to the fourth exemplary embodiment, the control apparatus controls communication between the terminals by holding configuration information so that the terminal belonging to the first virtual network may belong to the second virtual network. As a result, even in a case where there is restriction on the use of the number of the identifier of the first virtual network, it becomes possible to establish a large scale network by using the second virtual network.

While this invention has been particularly shown and described with reference to exemplary embodiments thereof, the invention is not limited to those specific embodiments. It will be understood by those of ordinary skill in the art that various changes in form and details may be made therein without departing from the spirit and scope of the present invention.

This application claims priority from Japanese Patent Application No. 2010-197630, filed on Sep. 3, 2010, the contents of which are incorporated herein by reference in their entirety.

The whole or part of the exemplary embodiments disclosed above can be described as, but not limited to, the following supplementary notes.

(Supplementary Note 1)

A control apparatus for controlling packet transfer between terminals belonging to a first virtual network identified by a first identifier comprising:

a network configuration information management means for holding configuration information on a second virtual network identified by a second identifier so that the terminals belong to the second virtual network; and a path control means for controlling communication between the terminals based on the configuration infOrmation on the second virtual network.

(Supplementary Note 2)

The control apparatus according to supplementary note 1, wherein the network configuration information management means manages identification information on the terminal for each of the terminals by correlating an identifier of the terminal to the first identifier provided in the terminal.

(Supplementary Note 3)

The control apparatus according to supplementary note 1 or 2, wherein the network configuration information management means manages configuration information on the second virtual network for each of the terminals by correlating identification information on the terminal to the second identifier provided in the terminal.

(Supplementary Note 4)

The control apparatus according to any one of supplementary notes 1 to 3, further comprising:

a searching means for searching for whether each of a source terminal and a destination terminal of the received packet has an identical second identifier from the network configuration information management means based on information on the received packet, when an inquiry about a received packet of a transfer apparatus which sends a packet is received, searching for the first identifier of the destination terminal from the network configuration information management means, when each of the source terminal and the destination terminal of the received packet has the identical second identifier, and discards the received packet when each of the source terminal and the destination terminal of the received packet has a different second identifier; and wherein the path control means calculates a transfer route between the source terminal and the destination terminal, and notifies of an order to set a processing rule including a process for the received packet to the transfer apparatus on the transfer route based on the detected first identifier of the destination terminal.

(Supplementary Note 5)

The control apparatus according to supplementary note 4;

wherein the searching means searches for the second identifier provided in the source terminal from the network configuration information management means based on the first identifier of the source terminal and an identifier of the source terminal|[S2], and for the first identifier provided in the destination terminal from the network configuration information management means based on an identifier of the destination terminal and the second, identifier provided in the source terminal obtained as a result of the search|[s3].

(Supplementary Note 6)

The control apparatus according to supplementary note 4 or 5, wherein the path control means sets a processing rule including a process to update the first identifier in a header of the received packet by the first identifier provided in the destination terminal, for a source transfer apparatus of the inquiry, and updates the first identifier of the header of the received packet in the processing rule corresponding to the received packet by the first identifier provided in the destination terminal for a transfer apparatus on the route of the received packet other than the source transfer apparatus of the inquiry.

(Supplementary Note 7)

The control apparatus according to supplementary note 4 or 5, wherein the path control means sets the processing rule including a process to update the second identifier in the header of the packet by the first identifier provided in the destination terminal for the transfer apparatus on the route of the received packet other than the source transfer apparatus of the inquiry.

(Supplementary Note 8)

The control apparatus according to any one of supplementary notes 3 to 7, wherein the network configuration information management means further stores an IP address of a terminal as the second network configuration information; and wherein the searching means searches for the second identifier provided in the source terminal from the network configuration information management means based on the first identifier provided in the source terminal, the identifier of the source terminal and the IP address of the source terminal, and searches for the first identifier provided in the destination terminal from the network configuration information management means based on the identifier of the destination terminal, the second identifier provided in the source terminal obtained as a result of the search and the IP address of the destination terminal, (Supplementary Note 9)

The control apparatus according to any one of supplementary notes 3 to 8, wherein the network configuration information management means further stores a list of the transfer apparatus in the second virtual network to which the terminal belongs as identification information on the terminal; and wherein the path control means searches for a transfer apparatus which belongs to the same second virtual network to which the source terminal or the destination terminal belongs from the list of the transfer apparatus.

(Supplementary Note 10)

A communication system comprising:

a terminal which belongs to a first virtual network identified by a first identifier; and a control apparatus for controlling packet transfer between the terminals;

wherein the control apparatus includes:

a network configuration information management means for holding configuration information on a second virtual network identified by a second identifier so that the terminals belong to the second virtual network; and a path control means for controlling communication between the terminals based on the configuration information on the second virtual network.

(Supplementary Note 11)

The communication system according to supplementary note 10, wherein the network configuration information management means manages identification information on the terminal for each of the terminals by correlating an identifier of the terminal to the first identifier provided in the terminal.

(Supplementary Note 12)

The communication system according to supplementary note 10 or 11, wherein the network configuration information management means manages configuration information on the second virtual network for each of the terminals by correlating identification information on the terminal to the second identifier provided in the terminal.

(Supplementary Note 13)

The communication system according to any one of supplementary notes 10 to 12, further comprising:

a transfer apparatus for processing for a received packet based on a processing rule which correlates a header of the received packet and processing corresponding to the packet, and inquiring to the control apparatus when the processing rule for the received packet is unknown;

wherein the control apparatus further comprising a searching means for searching for whether each of a source terminal and a destination terminal of the received packet has an identical second identifier from the network configuration information management means based on information on the received packet when having received the inquiry, searching for the first identifier of the destination terminal from the network configuration information management means when each of the source terminal and the destination terminal of the received packet has the identical second identifier, discards the received packet when each of the source terminal and the destination terminal of the received packet has a different second identifier; and wherein the path control means calculates a transfer route between the source terminal and the destination terminal, and notifies of an order to set a processing rule including processing for the received packet to the transfer apparatus on the transfer route according to the detected first identifier of the destination terminal.

(Supplementary Note 14)

The communication system according to supplementary note 13, wherein the searching means searches for the second identifier provided in the source terminal from the network configuration information management means based on the first identifier of the source terminal and an identifier of the source terminal, and searching for the first identifier provided in the destination terminal from the network configuration information management means based on an identifier of the destination terminal and the second identifier provided in the source terminal obtained as a result of the search.

(Supplementary Note 15)

The communication system according to supplementary note 13 or 14, wherein the path control means sets a processing rule including a process to update the first identifier in a header of the received packet by the first identifier provided in the destination terminal, for a source transfer apparatus of the inquiry, and updates the first identifier of the header of the received packet in the processing rule corresponding to the received packet by the first identifier provided in the destination terminal for a transfer apparatus on the route of the received packet other than the transmission source transfer apparatus of the inquiry.

(Supplementary Note 16)

The communication system according to supplementary note 13 or 14, wherein the path control means sets the processing rule including a process to update the second identifier in the header of the packet by the first identifier provided in the destination terminal for the transfer apparatus on the route of the received packet other than the source transfer apparatus of the inquiry.

(Supplementary Note 17)

The communication system according to any one of supplementary notes 12 to 16, wherein the network configuration information management means further stores an IP address of a terminal as the second network configuration information; and wherein the searching means searches for the second identifier provided in the source terminal from the network configuration information management means based on the first identifier provided in the source terminal, the identifier of the source terminal and the IP address of the source terminal, and searches for the first identifier provided in the destination terminal from the network configuration information management means based on the identifier of the destination terminal, the second identifier provided in the source terminal obtained as a result of the search and the IP address of the destination terminal.

(Supplementary Note 18)

The communication system according to any one of supplementary notes 12 to 17, wherein the network configuration information management means further stores a list of the transfer apparatus in the second virtual network to which the terminal belongs as identification information on the terminal; and wherein the path control means searches for a transfer apparatus which belongs to the same second virtual network to which the source terminal or the destination terminal belongs from the list of the transfer apparatus, (Supplementary Note 19)

A communication method for controlling packet transfer between terminals belonging to a first virtual network identified by a first identifier, comprising:

controlling communication between the terminals so that the terminals belong to a second virtual network identified by a second identifier based on configuration information on the second virtual network which is held in a network configuration information management means.

(Supplementary Note 20)

The communication method according to supplementary note 19, wherein the network configuration information management means manages identification information on the terminal for each of the terminals by correlating an identifier of the terminal to the first identifier provided in the terminal.

(Supplementary Note 21)

The communication method according to supplementary note 19 or 20, wherein the network configuration information management means manages configuration information on the second virtual network for each of the terminals by correlating identification information on the terminal to the second identifier provided in the terminal.

(Supplementary Note 22)

The communication method according to any one of supplementary notes 19 to 21, further comprising:

searching for whether each of a source terminal and a destination terminal of the received packet has an identical second identifier from the network configuration information management means based on information on the received packet when having received an inquiry about the received packet of a transfer apparatus which sends a packet;

searching for the first identifier of the destination terminal from the network configuration information management means when each of the source terminal and the destination terminal of the received packet has the identical second identifier;

discarding the received packet when each of the source terminal and the destination terminal of the received packet has a different second identifier;

calculating a transfer route between the source terminal and the destination terminal; and notifying of an order to set a processing rule including a process for the received packet to the transfer apparatus on the transfer route according to the detected first identifier of the destination terminal.

(Supplementary Note 23)

The communication method according to supplementary note 22, further comprising:

searching for the second identifier provided in the source terminal from the network configuration information management means based on the first identifier of the source terminal and an identifier of the source terminal; and searching for the first identifier provided in the destination terminal from the network configuration information management means based on an identifier of the destination terminal and the second identifier provided in the source terminal obtained as a result of the searching.

(Supplementary Note 24)

The communication method according to supplementary note 22 or 23, further comprising:

setting a processing rule including a process to update the first identifier in a header of the received packet by the first identifier provided in the destination terminal for a transmission source transfer apparatus of the inquiry; and updating the first identifier of the header of the received packet in the processing rule corresponding to the received packet by the first identifier provided in the destination terminal for a transfer apparatus on the route of the received packet other than the source transfer apparatus of the inquiry.

(Supplementary Note 25)

The communication method according to supplementary note 22 or 23, further comprising:

setting the processing rule including a process to update the second identifier in the header of the packet by the first identifier provided in the destination terminal for the transfer apparatus on the route of the received packet other than the source transfer apparatus of the inquiry.

(Supplementary Note 26)

The communication method according to any one of supplementary notes 21 to 25, wherein the network configuration information management means further stores an IP address of a terminal as the second network configuration information; and wherein the communication method further comprising:

searching for the second identifier provided in the source terminal from the network configuration information management means based on the first identifier provided in the source terminal, the identifier of the source terminal and the IP address of the source terminal; and searching for the first identifier provided in the destination terminal from the network configuration information management means based on the identifier of the destination terminal, the second identifier provided in the source terminal obtained as a result of the search and the IP address of the destination terminal.

(Supplementary Note 27)

The communication method according to any one of supplementary notes 21 to 25, wherein the network configuration information management means further stores a list of the transfer apparatus in the second virtual network to which the terminal belongs as identification information on the terminal; and wherein the communication method further comprising:

searching for a transfer apparatus which belongs to the same second virtual network to which the source terminal or the destination terminal belongs from the list of the transfer apparatus.

(Supplementary Note 28)

A recording medium having recorded thereon a communication program for causing a computer to execute a process of controlling packet transfer between terminals belonging to a first virtual network identified by a first identifier, comprising:

a path control process for controlling communication between the terminals so that the terminals belong to a second virtual network identified by a second identifier based on configuration information on the second virtual network which is held in a network configuration information management means.

(Supplementary Note 29)

The recording medium according to supplementary note 28, wherein the network configuration information management means manages identification information on the terminal for each of the terminals by correlating an identifier of the terminal to the first identifier provided in the terminal.

(Supplementary Note 30)

The recording medium according to supplementary note 28 or 29, wherein the network configuration information management means manages configuration information on the second virtual network for each of the terminals by correlating identification information on the terminal to the second identifier provided in the terminal.

(Supplementary Note 31)

The recording medium according to any one of supplementary notes 28 to 30, further comprising:

a searching process for searching for whether each of a source terminal and a destination terminal of the received packet has an identical second identifier from the network configuration information management means based on information on the received packet when having received an inquiry about the received packet of a transfer apparatus which sends a packet, searching for the first identifier of the destination terminal from the network configuration information management means when each of the source terminal and the destination terminal of the received packet has the identical second identifier, and discarding the received packet when each of the source terminal and the destination terminal of the received packet has a different second identifier; and wherein the path control process further includes calculating a transfer route between the source terminal and the destination terminal, and notifying of an order to set a processing rule including a process for the received packet to the transfer apparatus on the transfer route according to the detected first identifier of the destination terminal.

(Supplementary Note 32)

The recording medium according to supplementary note 31, wherein the searching process further includes searching for the second identifier provided in the source terminal from the network configuration information management means based on the first identifier of the source terminal and an identifier of the source terminal, and searching for the first identifier provided in the destination terminal from the network configuration information management means based on an identifier of the destination terminal and the second identifier provided in the source terminal obtained as a result of the searching.

(Supplementary Note 33)

The recording medium according to supplementary note 31 or 32, wherein the path control process further includes setting a processing rule including a process to update the first identifier in a header of the received packet by the first identifier provided in the destination terminal for a transmission source transfer apparatus of the inquiry, and updating the first identifier of the header of the received packet in the processing rule corresponding to the received packet by the first identifier provided in the destination terminal for a transfer apparatus on the route of the received packet other than the source transfer apparatus of the inquiry.

(Supplementary Note 34)

The recording medium according to supplementary note 31 or 32, wherein the path control process further includes setting the processing rule including a process to update the second identifier in the header of the packet by the first identifier provided in the destination terminal for the transfer apparatus on the route of the received packet other than the transmission source transfer apparatus of the inquiry.

(Supplementary Note 35)

The recording medium according to any one of supplementary notes 30 to 34, wherein the network configuration information management means further stores an IP address of a terminal as the second network configuration information; and wherein the searching process further includes searching for the second identifier provided in the source terminal from the network configuration information management means based on the first identifier provided in the source terminal, the identifier of the source terminal and the IP address of the source terminal, and searching for the first identifier provided in the destination terminal from the network configuration information management means based on the identifier of the destination terminal, the second identifier provided in the source terminal obtained as a result of the search and the IP address of the destination terminal.

(Supplementary Note 36)

The recording medium according to any one of supplementary notes 30 to 34, wherein the network configuration information management means further stores a list of the transfer apparatus in the second virtual network to which the terminal belongs as identification information on the terminal; and wherein the path control process further includes searching for a transfer apparatus which belongs to the same second virtual network to which the source terminal or the destination terminal belongs from the list of the transfer apparatus.

REFERENCE SIGNS LIST 1, 2 a network NW
100, 200 a controller
300 an OF controller
400 a control apparatus
101, 201, 301 a network configuration information table
401 a network configuration information management unit
101-1, 101-2, 101-N, 201-1, 201-2, 201-N, 301-1, 301-2, 301-N, 401-1, 401-2, 401-N a network configuration information entry
102, 202, 302 a search unit
103, 203, 303 a path control unit
110, 120, 210, 220 a switch
310, 320 an OF switch
111, 121, 211, 221, 311, 321 a packet transfer unit
112, 122, 212, 222 a forwarding table
112-1, 112-2, 112-M a forwarding table entry
312, 322 a flow table
312-1, 312-2, 312-M a flow table entry
130, 140, 230, 240, 330, 340 a terminal

The invention claimed is:

1. A control apparatus for controlling packet transfer between terminals belonging to a first virtual network identified by a first type of identifier, the control apparatus comprising:
  a network configuration information management unit that holds configuration information on a second virtual network identified by a second type of identifier, the second type of identifier being solely capable of identifying more number of networks than number of networks the first type of identifier can identify, so that the terminals belong to the second virtual network; and
  a path control unit that controls communication between the terminals based on the configuration information on the second virtual network,
  wherein the first type of identifier comprises a VLAN-ID (virtual local area network identifier), and
  wherein the second type of identifier comprises a NW-ID (network identifier).

2. The control apparatus according to claim 1,
  wherein the network configuration information management unit manages identification information on a terminal for each of the terminals by correlating an identifier of the terminal to the first type of identifier provided in the terminal.

3. The control apparatus according to claim 1,
  wherein the network configuration information management unit manages configuration information on the second virtual network for each of the terminals by correlating identification information on the terminal from among the terminals to the second type of identifier provided in the terminal.

4. The control apparatus according to claim 1, further comprising:

a searching unit that searches for whether each of a source terminal and a destination terminal of a received packet has an identical second type of identifier from the network configuration information management unit based on information on the received packet, when an inquiry about a received packet of a transfer apparatus which sends a packet is received, searching for a first type of identifier of the destination terminal from the network configuration information management unit, when each of the source terminal and the destination terminal of the received packet has the identical second type of identifier, and discards the received packet when each of the source terminal and the destination terminal of the received packet has a different second type of identifier; and wherein the path control unit calculates a transfer route between the source terminal and the destination terminal, and notifies of an order to set a processing rule including a process for the received packet to the transfer apparatus on the transfer route based on the detected first type of identifier of the destination terminal.

5. The control apparatus according to claim 4, wherein the searching unit searches for the second type of identifier provided in the source terminal from the network configuration information management unit based on a first type of identifier of the source terminal and an identifier of the source terminal, and for the first type of identifier provided in the destination terminal from the network configuration information management unit based on an identifier of the destination terminal and the second type of identifier provided in the source terminal obtained as a result of the search.

6. The control apparatus according to claim 4, wherein the path control unit sets a processing rule including a process to update the first type of identifier in a header of the received packet by the first type of identifier provided in the destination terminal, for a source transfer apparatus of the inquiry, and updates the first type of identifier of the header of the received packet in the processing rule corresponding to the received packet by the first type of identifier provided in the destination terminal for a transfer apparatus on a route of the received packet other than the source transfer apparatus of the inquiry.

7. The control apparatus according to claim 4, wherein the path control unit sets the processing rule including a process to update the second type of identifier in the header of the packet by the first type of identifier provided in the destination terminal for the transfer apparatus on a route of the received packet other than the source transfer apparatus of the inquiry.

8. The control apparatus according to claim 4, wherein the network configuration information management unit further stores an IP (Internet Protocol) address of a terminal as the configuration information on the second virtual network; and wherein the searching unit searches for the second type of identifier provided in the source terminal from the network configuration information management unit based on the first type of identifier provided in the source terminal, the identifier of the source terminal and the IP address of the source terminal, and searches for the first type of identifier provided in the destination terminal from the network configuration information management unit based on the identifier of the destination terminal, the second type of identifier provided in the source terminal obtained as a result of the search and the IP address of the destination terminal.

9. The control apparatus according to claim 4, wherein the network configuration information management unit further stores a list of the transfer apparatus in the second virtual network to which the terminal from among the terminals belongs as identification information on the terminal; and wherein the path control unit searches for a transfer apparatus which belongs to the same second virtual network to which the source terminal or the destination terminal belongs from the list of the transfer apparatus.

10. The control apparatus according to claim 1, wherein the first type of identifier comprises a VLAN-ID (virtual local area network identification), and wherein the second type of identifier comprises a VLAN-ID.

11. The control apparatus according to claim 1, wherein the first type of identifier comprises VLAN-ID (virtual local area network identifier), and wherein the second type of identifier is one of a NW-ID (network identifier) and an SSID (service set identifier).

12. The control apparatus according to claim 1, wherein the second type of identifier being solely capable of identifying more number of networks than number of networks the first type of identifier can identify, so that the terminals belong to the second virtual network.

13. A communication system comprising:

a terminal which belongs to a first virtual network identified by a first type of identifier; and a control apparatus for controlling packet transfer between terminals;

wherein the control apparatus includes: a network configuration information management unit that holds configuration information on a second virtual network identified by a second type of identifier, the second type of identifier being capable of identifying more number of networks than number of networks the first type of identifier can identify, so that the terminals belong to the second virtual network; and a path control unit that controls communication between the terminals based on the configuration information on the second virtual network;

wherein the first type of identifier comprises a VLAN-ID (virtual local area network identifier), and wherein the second type of identifier comprises a NW-ID (network identifier).

14. The communication system according to claim 13, wherein the network configuration information management unit manages identification information on a terminal for each of the terminals by correlating an identifier of the terminal from among the terminals to the first type of identifier provided in the terminal.

15. The communication system according to claim 13, wherein the network configuration information management unit manages configuration information on the second virtual network for each of the terminals by correlating identification information on the terminal from among the terminals to the second type of identifier provided in the terminal.

16. The communication system according to claim 13, further comprising:

a transfer apparatus for processing for a received packet based on a processing rule which correlates a header of the received packet and processing corresponding to the packet, and inquiring to the control apparatus when the processing rule for the received packet is unknown;

wherein the control apparatus further comprising a searching unit that searches for whether each of a source terminal and a destination terminal of the received packet has an identical second type of identifier from the network configuration information management unit based on information on the received packet when having received the inquiry, searching for a first type of identifier of the destination terminal from the network configuration information management unit when each of the source terminal and the destination terminal of the received packet has the identical second type of identifier, discards the received packet when each of the source terminal and the destination terminal of the received packet has a different second type of identifier; and wherein the path control unit calculates a transfer route between the source terminal and the destination terminal, and notifies of an order to set a processing rule including processing for the received packet to the transfer apparatus on the transfer route according to the detected first type of identifier of the destination terminal.

17. The communication system according to claim 16, wherein the searching unit searches for the second type of identifier provided in the source terminal from the network configuration information management unit based on the first type of identifier of the source terminal and an identifier of the source terminal, and searching for the first type of identifier provided in the destination terminal from the network configuration information management unit based on an identifier of the destination terminal and the second type of identifier provided in the source terminal obtained as a result of the search.

18. The communication system according to claim 16, wherein the path control unit sets a processing rule including a process to update the first type of identifier in a header of the received packet by the first type of identifier provided in the destination terminal, for a source transfer apparatus of the inquiry, and updates the first type of identifier of the header of the received packet in the processing rule corresponding to the received packet by the first type of identifier provided in the destination terminal for a transfer apparatus on the route of the received packet other than the transmission source transfer apparatus of the inquiry.

19. The communication system according to claim 16, wherein the path control unit sets the processing rule including a process to update the second type of identifier in the header of the packet by the first type of identifier provided in the destination terminal for the transfer apparatus on the route of the received packet other than the source transfer apparatus of the inquiry.

20. The communication system according to claim 16, wherein the network configuration information management unit further stores an IP (Internet Protocol) address of a terminal as the configuration information on the second virtual network; and wherein the searching unit searches for the second type of identifier provided in the source terminal from the network configuration information management unit based on the first type of identifier provided in the source terminal, the identifier of the source terminal and the IP address of the source terminal, and searches for the first type of identifier provided in the destination terminal from the network configuration information management unit based on the identifier of the destination terminal, the second type of identifier provided in the source terminal obtained as a result of the search and the IP address of the destination terminal.

21. The communication system according to claim 16, wherein the network configuration information management unit further stores a list of the transfer apparatus in the second virtual network to which the terminal belongs as identification information on the terminal; and wherein the path control unit searches for a transfer apparatus which belongs to the same second virtual network to which the source terminal or the destination terminal belongs from the list of the transfer apparatus.

22. The communication system according to claim 13, wherein the first type of identifier comprises VLAN-ID (virtual local area network identifier), and wherein the second type of identifier is one of a NW-ID (network identifier) and an SSID (service set identifier).

23. A communication method for controlling packet transfer between terminals belonging to a first virtual network identified by a first type of identifier, comprising:

controlling communication between the terminals so that the terminals belong to a second virtual network identified by a second type of identifier, the second type of identifier being capable of identifying more number of networks than number of networks the first type of identifier can identify, based on configuration information on the second virtual network which is held in a network configuration information management unit.

24. The communication method according to claim 23, wherein the network configuration information management unit manages identification information on a terminal for each of the terminals by correlating an identifier of the terminal to the first type of identifier provided in the terminal from among the terminals.

25. The communication method according to claim 23, wherein the network configuration information management unit manages configuration information on the second virtual network for each of the terminals by correlating identification information on the terminal to the second type of identifier provided in the terminal from among the terminals.

26. The communication method according to claim 23, further comprising:

searching for whether each of a source terminal and a destination terminal of a received packet has an identical second type of identifier from the network configuration information management unit based on information on the received packet when having received an inquiry about the received packet of a transfer apparatus which sends a packet;

searching for a first type of identifier of the destination terminal from the network configuration information management unit when each of the source terminal and the destination terminal of the received packet has the identical second type of identifier;

discarding the received packet when each of the source terminal and the destination terminal of the received packet has a different second type of identifier;

calculating a transfer route between the source terminal and the destination terminal; and notifying of an order to set a processing rule including a process for the received packet to the transfer apparatus on the transfer route according to the detected first type of identifier of the destination terminal.

27. The communication method according to claim 26, further comprising:

searching for the second type of identifier provided in the source terminal from the network configuration information management unit based on a first type of identifier of the source terminal and an identifier of the source terminal; and searching for the first type of identifier provided in the destination terminal from the network configuration information management unit based on an identifier of the destination terminal and the second type of identifier provided in the source terminal obtained as a result of the searching.

28. The communication method according to claim 26, further comprising:

setting a processing rule including a process to update the first type of identifier in a header of the received packet by the first type of identifier provided in the destination terminal for a transmission source transfer apparatus of the inquiry; and updating the first type of identifier of the header of the received packet in the processing rule corresponding to the received packet by the first type of identifier provided in the destination terminal for a transfer apparatus on a route of the received packet other than the source transfer apparatus of the inquiry.

29. The communication method according to claim 26, further comprising:

setting the processing rule including a process to update the second type of identifier in the header of the packet by the first type of identifier provided in the destination terminal for the transfer apparatus on a route of the received packet other than the source transfer apparatus of the inquiry.

30. The communication method according to claim 26, wherein the network configuration information management unit is configured to further store an IP (Internet Protocol) address of a terminal as the configuration information on the second virtual network; and wherein the communication method further comprising:

searching for the second type of identifier provided in the source terminal from the network configuration information management unit based on the first type of identifier provided in the source terminal, the identifier of the source terminal and the IP address of the source terminal; and searching for the first type of identifier provided in the destination terminal from the network configuration information management unit based on the identifier of the destination terminal, the second type of identifier provided in the source terminal obtained as a result of the search and the IP address of the destination terminal.

31. The communication method according to claim 26, wherein the network configuration information management unit further stores a list of the transfer apparatus in the second virtual network to which the terminal belongs as identification information on the terminal; and wherein the communication method further comprising:

searching for a transfer apparatus which belongs to the same second virtual network to which the source terminal or the destination terminal belongs from the list of the transfer apparatus.

32. The communication method according to claim 23, wherein the first type of identifier comprises VLAN-ID (virtual local area network identifier), and wherein the second type of identifier is one of a NW-ID (network identifier) and an SSID (service set identifier).

33. A non-transitory recording medium having recorded thereon a communication program for causing a computer to execute a process of controlling packet transfer between terminals belonging to a first virtual network identified by a first type of identifier, comprising:

a path control process for controlling communication between the terminals so that the terminals belong to a second virtual network identified by a second type of identifier, the second type of identifier being solely capable of identifying more number of networks than number of networks the first type of identifier can identify, based on configuration information on the second virtual network which is held in a network configuration information management unit, wherein the first type of identifier comprises a VLAN-ID (virtual local area network identifier), and wherein the second type of identifier comprises a NW-ID (network identifier).

34. The non-transitory recording medium according to claim 33, wherein the network configuration information management unit manages identification information on a terminal for each of the terminals by correlating an identifier of the terminal to the first type of identifier provided in the terminal from among the terminals.

35. The non-transitory recording medium according to claim 33, wherein the network configuration information management unit manages configuration information on the second virtual network for each of the terminals by correlating identification information on the terminal from among the terminals to the second type of identifier provided in the terminal.

36. The non-transitory recording medium according to claim 33, further comprising:

a searching process for searching for whether each of a source terminal and a destination terminal of a received packet has an identical second type of identifier from the network configuration information management unit based on information on the received packet when having received an inquiry about the received packet of a transfer apparatus which sends a packet, searching for a first type of identifier of the destination terminal from the network configuration information management unit when each of the source terminal and the destination terminal of the received packet has the identical second type of identifier, and discarding the received packet when each of the source terminal and the destination terminal of the received packet has a different second type of identifier; and wherein the path control process further includes calculating a transfer route between the source terminal and the destination terminal, and notifying of an order to set a processing rule including a process for the received packet to the transfer apparatus on the transfer route according to the detected first type of identifier of the destination terminal.

37. The non-transitory recording medium according to claim 36,
wherein the searching process further includes searching for the second type of identifier provided in the source terminal from the network configuration information management unit based on a first type of identifier of the source terminal and an identifier of the source terminal, and searching for the first type of identifier provided in the destination terminal from the network configuration information management unit based on an identifier of the destination terminal and the second type of identifier provided in the source terminal obtained as a result of the searching.

38. The non-transitory recording medium according to claim 36,
wherein the path control process further includes setting a processing rule including a process to update the first type of identifier in a header of the received packet by the first type of identifier provided in the destination terminal for a transmission source transfer apparatus of the inquiry, and updating the first type of identifier of the header of the received packet in the processing rule corresponding to the received packet by the first type of identifier provided in the destination terminal for a transfer apparatus on a route of the received packet other than the source transfer apparatus of the inquiry.

39. The non-transitory recording medium according to claim 36,
wherein the path control process further includes setting the processing rule including a process to update the second type of identifier in the header of the packet by the first type of identifier provided in the destination terminal for the transfer apparatus on a route of the received packet other than the transmission source transfer apparatus of the inquiry.

40. The non-transitory recording medium according to claim 36,
wherein the network configuration information management unit further stores an IP address of a terminal as the configuration information on the second virtual network; and
wherein the searching process further includes searching for the second type of identifier provided in the source terminal from the network configuration information management unit based on the first type of identifier provided in the source terminal, the identifier of the source terminal and the IP address of the source terminal, and searching for the first type of identifier provided in the destination terminal from the network configuration information management unit based on the identifier of the destination terminal, the second type of identifier provided in the source terminal obtained as a result of the search and the IP address of the destination terminal.

41. The non-transitory recording medium according to claim 36,
wherein the network configuration information management unit further stores a list of the transfer apparatus in the second virtual network to which the terminal belongs as identification information on the terminal; and
wherein the path control process further includes searching for a transfer apparatus which belongs to the same second virtual network to which the source terminal or the destination terminal belongs from the list of the transfer apparatus.

42. The non-transitory recording medium according to claim 33, wherein the first type of identifier comprises VLAN-ID (virtual local area network identifier), and
wherein the second type of identifier is one of a NW-ID (network identifier) and an SSID (service set identifier).

43. A control apparatus for controlling packet transfer between terminals belonging to a first virtual network identified by a first type of identifier comprising:
a network configuration information management unit configured for holding configuration information on a second virtual network identified by a second type of identifier, the second type of identifier being capable of identifying more number of networks than number of networks the first type of identifier can identify, so that the terminals belong to the second virtual network; and
a path control unit configured for controlling communication between the terminals based on the configuration information on the second virtual network, wherein the first type of identifier comprises a VLAN-ID (virtual local area network identifier), and wherein the second type of identifier comprises a NW-ID (network identifier).

44. The control apparatus according to claim 43, wherein the first type of identifier comprises VLAN-ID (virtual local area network identifier), and
wherein the second type of identifier is one of a NW-ID (network identifier) and an SSID (service set identifier).

45. A communication system comprising:
a terminal which belongs to a first virtual network identified by a first type of identifier; and
a control apparatus for controlling packet transfer between terminals;
wherein the control apparatus includes: a network configuration information management unit configured for holding configuration information on a second virtual network identified by a second type of identifier, the second type of identifier being solely capable of identifying more number of networks than number of networks the first type of identifier can identify, so that the terminals belong to the second virtual network; and
a path control means for controlling communication between the terminals based on the configuration information on the second virtual network, wherein the first type of identifier comprises a VLAN-ID (virtual local area network identifier), and wherein the second type of identifier comprises a NW-ID (network identifier).

46. The communication system according to claim 45, wherein the first type of identifier comprises VLAN-ID (virtual local area network identifier), and
wherein the second type of identifier is one of a NW-ID (network identifier) and an SSID (service set identifier).

* * * * *